US011919307B2

(12) United States Patent
Raymond et al.

(10) Patent No.: US 11,919,307 B2
(45) Date of Patent: Mar. 5, 2024

(54) MOBILE PRINTHEAD CLEANER FOR PRINT MODULE

(71) Applicant: Prototype and Production Systems, Inc., Minneapolis, MN (US)

(72) Inventors: Willard Charles Raymond, Plymouth, MN (US); Charles Carlson Langford, Plymouth, MN (US); Nathan Albert Bergman, Minneapolis, MN (US); Michael Laurence Beauchene, Dayton, MN (US); Anthony David Kaufhold, Chaska, MN (US); Richard Charles Raymond, Fridley, MN (US); Nicholas Todd Mann, Orono, MN (US)

(73) Assignee: Prototype and Production Systems, Inc., Minneapolis, MN (US)

( * ) Notice: Subject to any disclaimer, the term of this patent is extended or adjusted under 35 U.S.C. 154(b) by 252 days.

(21) Appl. No.: 17/270,942

(22) PCT Filed: Aug. 29, 2019

(86) PCT No.: PCT/US2019/048871
§ 371 (c)(1),
(2) Date: Feb. 24, 2021

(87) PCT Pub. No.: WO2020/051066
PCT Pub. Date: Mar. 12, 2020

(65) Prior Publication Data

US 2021/0339535 A1 Nov. 4, 2021

Related U.S. Application Data

(60) Provisional application No. 62/726,489, filed on Sep. 4, 2018.

(51) Int. Cl.
*B41J 2/165* (2006.01)
*B41J 2/14* (2006.01)
(Continued)

(52) U.S. Cl.
CPC ......... *B41J 2/1433* (2013.01); *B41J 2/16505* (2013.01); *B41J 2/16508* (2013.01);
(Continued)

(58) Field of Classification Search
CPC .. B41J 2/1433; B41J 2/16505; B41J 2/16508; B41J 2/16511; B41J 2/1652;
(Continued)

(56) References Cited

U.S. PATENT DOCUMENTS 5,138,334 A 8/1992 Rowe et al.
5,300,958 A 4/1994 Burke et al.
(Continued)

FOREIGN PATENT DOCUMENTS

CN 105538928 2/2016
DE 102014111466 A1 8/2014
(Continued)

OTHER PUBLICATIONS

European Patent Office, Supplementary European Search Report (Art. 153(7) EPC) and the European search opinion, counterpart European Patent Application No. 19857252.1 (dated Apr. 8, 2022).
(Continued)

*Primary Examiner* — Yaovi M Ameh
(74) *Attorney, Agent, or Firm* — Schroeder & Siegfried, P.A.

(57) ABSTRACT

A single pass inkjet printer that utilizes a modular printing system with one or more self-contained printing modules, where each printing module is easy to remove and replace from a large printing machine, thus resulting in an overall system that is easy to service and maintain Each module is a self-contained printer including an ink supply, printhead drive electronics, and printhead assembly in order to provide one color or fluid of inkjet printing capability. Each module includes a precise three-point compliant self-aligning mount
(Continued)

system to obtain accurate printhead positioning, and a unique integrated printhead tending system that includes a compact movable vacuum knife for cleaning the printheads, and a printhead capping station for sealing and protecting the printheads from the ambient environment when not in use.

20 Claims, 18 Drawing Sheets

(51) Int. Cl.

| | |
|---|---|
| ***B41J 2/175*** | (2006.01) |
| ***B41J 11/00*** | (2006.01) |
| ***B41J 25/00*** | (2006.01) |
| ***B41J 25/304*** | (2006.01) |
| ***B41J 25/34*** | (2006.01) |
| ***B41J 29/02*** | (2006.01) |

(52) U.S. Cl.
CPC ......... *B41J 2/16511* (2013.01); *B41J 2/1652* (2013.01); *B41J 2/16532* (2013.01); *B41J 2/16547* (2013.01); *B41J 2/16552* (2013.01); *B41J 2/16588* (2013.01); *B41J 2/1752* (2013.01); *B41J 11/008* (2013.01); *B41J 25/001* (2013.01); *B41J 25/003* (2013.01); *B41J 25/304* (2013.01); *B41J 25/34* (2013.01); *B41J 29/02* (2013.01); *B41J 2002/16555* (2013.01); *B41J 2002/16558* (2013.01); *B41J 2/16585* (2013.01); *B41J 2202/20* (2013.01); *B41J 2202/21* (2013.01)

(58) Field of Classification Search
CPC ................ B41J 2/16532; B41J 2/16552; B41J 2/16588; B41J 2/1752; B41J 11/008; B41J 25/001; B41J 25/003; B41J 25/304; B41J 25/34; B41J 29/02; B41J 2002/16555; B41J 2202/20; B41J 2202/21; B41J 2/16547; B41J 2/16585; B41J 2002/16558
See application file for complete search history.

(56) References Cited

U.S. PATENT DOCUMENTS

| | | | | |
|---|---|---|---|---|
| 5,534,897 | A | 7/1996 | Anderson et al. | |
| 5,980,018 | A | 11/1999 | Taylor et al. | |
| 6,042,215 | A | 3/2000 | Imai | |
| 6,280,014 | B1 | 8/2001 | Sharma et al. | |
| 6,312,090 | B1 | 11/2001 | Griffin et al. | |
| 6,471,329 | B1 | 10/2002 | Maza | |
| 6,478,402 | B1 | 11/2002 | Greive | |
| 6,692,113 | B2 | 2/2004 | Silverbrook et al. | |
| 6,886,907 | B1 | 5/2005 | Okamoto et al. | |
| 7,401,899 | B2 | 7/2008 | Nellen | |
| 7,497,548 | B2 | 3/2009 | Yamazaki et al. | |
| 7,517,046 | B2 | 4/2009 | Silverbrook | |
| 8,926,059 | B2 | 1/2015 | Justice et al. | |
| 9,132,640 | B2 | 9/2015 | Wilson et al. | |
| 9,233,541 | B1 | 1/2016 | Cyr et al. | |
| 10,252,531 | B2 | 4/2019 | Schnepp | |
| 2002/0085058 | A1* | 7/2002 | Griffin ................. | B41J 2/16552 347/30 |
| 2003/0222939 | A1 | 12/2003 | Gompertz | |
| 2004/0046828 | A1 | 3/2004 | Yamada et al. | |
| 2004/0090488 | A1 | 5/2004 | Nellen | |
| 2005/0156963 | A1 | 7/2005 | Song et al. | |
| 2006/0139400 | A1 | 6/2006 | Nellen | |
| 2006/0139405 | A1 | 6/2006 | Nellen | |
| 2008/0204503 | A1 | 8/2008 | Struder et al. | |
| 2009/0284566 | A1 | 11/2009 | Suzuki et al. | |
| 2009/0295878 | A1 | 12/2009 | Hanchak et al. | |
| 2011/0050799 | A1 | 3/2011 | Nishida | |
| 2011/0149000 | A1 | 6/2011 | Albertalli et al. | |
| 2012/0092403 | A1* | 4/2012 | Profaca ................ | H04N 1/6016 347/49 |
| 2012/0147094 | A1 | 6/2012 | Hagiwara et al. | |
| 2013/0100207 | A1 | 4/2013 | Van Der Zwan | |
| 2014/0168319 | A1 | 6/2014 | Moreau et al. | |
| 2014/0340445 | A1 | 11/2014 | Achatz et al. | |
| 2016/0009111 | A1 | 1/2016 | Li et al. | |
| 2016/0207304 | A1 | 7/2016 | Schafer | |
| 2017/0282614 | A1 | 10/2017 | Lutz et al. | |
| 2017/0313108 | A1 | 11/2017 | Profaca et al. | |
| 2017/0341423 | A1* | 11/2017 | Schnepp .............. | B41J 2/16588 |
| 2018/0029376 | A1 | 2/2018 | Todd et al. | |
| 2018/0229497 | A1 | 8/2018 | Darrow et al. | |

FOREIGN PATENT DOCUMENTS

| | | | | |
|---|---|---|---|---|
| DE | 102015215721 A1 | 8/2015 | | |
| EP | 1238813 A1 | 9/2002 | | |
| EP | 2481587 A1 * | 8/2012 | .......... | B41J 2/16505 |
| EP | 2481587 A1 | 8/2012 | | |
| EP | 3248799 A1 | 11/2017 | | |
| KR | 20060120251 | 11/2006 | | |
| WO | 2011/143698 A1 | 11/2011 | | |
| WO | 2013173647 A1 | 11/2013 | | |
| WO | 2016102000 A1 | 6/2016 | | |
| WO | 2016108199 A1 | 7/2016 | | |

OTHER PUBLICATIONS

India Intellectual Property Office, First Examination Report, counterpart Indian Application No. 202147015533 (dated Oct. 4, 2021).

International Search Report and Written Opinion of International Searching Authority, counterpart Application No. PCT/US2019/048871 (dated Nov. 14, 2019).

International Preliminary Examination Report on Patentability, counterpart Application No. PCT/US2019/048871 (dated Oct. 13, 2020).

Korean Intellectual Property Office, Notice of Preliminary Rejection (Kpa Article 63), counterpart Korean Patent Application No. 10-2021-7009743 (dated Jan. 12, 2023).

* cited by examiner

MOBILE PRINTHEAD CLEANER FOR PRINT MODULE

CROSS REFERENCE TO RELATED APPLICATIONS

This application is a nonprovisional patent application which claims the benefit of U.S. Provisional Application Ser. No. 62/726,489, filed on Sep. 4, 2018, entitled "Single Pass Inkjet Printer With Modular Printhead System," the contents of which is incorporated herein in its entirety by reference thereto.

FIELD OF INVENTION

The present invention relates generally to the field of fluid inkjet printers, and more particularly to large-scale single pass inkjet printers used primarily for commercial and industrial high resolution printing applications. Even more specifically, the present invention pertains to a modular design of a printhead system for such an inkjet printer which provides an effective and efficient solution for accurate printhead positioning, and facilitates improved automated printhead servicing.

BACKGROUND

The statements in this section merely provide background information related to the present disclosure and may not constitute prior art.

The advantage of single pass inkjet technology is its high print speeds. Unlike traditional scanning printers, which pass over one area of print several times, with single pass printing (as its name implies), each printhead passes by the material to be printed exactly once. As inkjet technology progresses, the resolution of printheads available to the market continues to increase. With this increased resolution comes the capability to create higher quality printing using the single pass approach. Print quality in single pass inkjet printing is greatly affected by the accuracy of the placement of each inkjet drop. Inkjet drop placement is affected by the location of each printhead, especially in relation to other printheads in the system. Single pass printers often require large arrays of printheads that are placed accurately with respect to each other. The cost of building large arrays of printheads with the required placement accuracy has been a barrier to the adoption of single pass inkjet printing.

Maintenance and serviceability of single pass inkjet printers can also present difficult challenges, particularly with the ever-increasing desire to increase the width of such printers. In most conventional single pass inkjet printer systems, large arrays of printheads are tied together in a single printbar to achieve one continuous print output. Each inkjet printhead is essentially composed of an array of nozzles that shoot ink down onto a substrate. These nozzles are very small and can be easily clogged by drying/curing ink, dust or debris, etc. This does not often cause a problem in a scanning printer because different parts of the printhead are passing over the same spot on the printed material several times. If one nozzle is out another in the same printhead will make up for it and there will be no visible defect. This compensation does not occur in single pass printing, and one stuck nozzle can cause a visible print defect in the output.

With thousands of nozzles per printhead in a printer that incorporates dozens of heads, there are a lot of opportunities for one clogged jet to turn the output from product to waste, Printheads are also very expensive and delicate, Servicing these components by hand (wiping or spraying them) can cause more harm than good if debris is pushed up into the nozzle plate and a new printhead is required. Moreover, with conventional single pass printers, the wide arrays of printheads can be quite large and difficult to service due to the limited arm reach of service personnel.

Several attempts at head tending have heretofore been made, but each has its drawbacks, Drawing a small squeegee across the heads is one such method, but is not desirable because it physically touches the printheads. If a hard piece of debris (e.g., metal shaving) were to be on one of the printheads it would be pulled across the remainder of that head and possibly several others, causing considerable damage. It is also possible for the squeegee to push debris up into the small nozzle openings, as previously mentioned.

Other attempts have included the use of a stationary vacuum system. In this scenario, the array of printheads move to the vacuum and the heads are passed across the vacuum system located just below the printhead height to pull debris away. While this works well, it requires movement of the printer through its entire cross-web length in order to clean the heads. This solution allows easy access to the printer and printheads for maintenance, but must then return to an extremely reliable and accurate position above the substrate for printing. Often the entire array of print heads must be moved for head tending and then moved back to the print position with alignment within a few microns. This motion is difficult to achieve with equipment of reasonable size and cost. On a small system this may be acceptable, but as the size of the printing system scales up to four feet or more in width, this becomes space prohibitive.

One major drawback is that both of the foregoing solutions require a capping or head tending station that essentially doubles the width of the printer. For head tending, the printing system must be moved offline to a maintenance station that is at least as large as the entire width of the printer. In order to cap the printer heads, the printer must raise up such that a printhead capping station (which doubles the width of the printer) can move under the printheads from some offline position, or the printer is moved offline over a stationary capping station. Either solution creates a large footprint that does not scale up well. It is possible to build the printheads into the system in exactly the correct position over the substrate and not allow them to be moved for service. However, while this ensures the printheads are in the correct physical location, it makes servicing the system or changing the printhead extremely arduous and time consuming.

It is therefore evident that there is a significant need in the industry for a more versatile and efficient inkjet printing system which will effectively provide accurate printhead positioning, and facilitate improved automated printhead servicing that does not have the inherent problems of conventional inkjet printers noted above. The challenge is to build a system that can be serviced easily but also maintain an extremely accurate and reliable print location. It is with this objective in mind, and more, that we have developed our improved single pass inkjet printer with a modular printhead system, as will be described in more detail below.

SUMMARY

In furtherance of the foregoing objectives, the present invention is comprised of a single pass inkjet printer that is composed generally of a modular printing system. The modular printing system includes one or more self-contained printing modules, each of which is easy to remove and replace from a large printing machine, thus resulting in an overall system that is easy to service and maintain. Each module is a self-contained printer including an ink supply, printhead drive electronics, and a printhead assembly (i.e., printbar and printheads), in order to provide one color or fluid of inkjet printing capability. Many systems will incorporate between four and ten of these modules to print many colors, varnish, or other functional fluids. One fluid requires one printing module. For purposes of the present discussion, the terms "web" and "substrate" will be used to define a material which passes below a designated print position of the printheads.

Most conventional printers require four or more process colors to be printed in precise register in order to achieve high print quality and maximize the output of the latest printheads with resolutions greater than 1000 dpi. With the present invention, each printing module utilizes a precise compliant mount system to achieve precise location and register of the printheads. Each printing module is built as a movable subassembly including a printbar to which the printheads are mounted. This subassembly is constructed such that it can be raised up and slid out away from the printer web to be easily serviced or replaced.

To achieve precise location and register of the printheads over the web, each module includes a plurality of fixed guide members fastened to the bottom of the printbar. These guide members are positioned to mate precisely with corresponding adjustable alignment members mounted on opposing sides of a printhead alignment fixture which extends over the web. The printhead alignment fixture is secured to the base of the printer, such that the alignment members will always reliably return the printbar to the same position. At least some of the alignment members are readily adjustable to ensure precise printhead registration, as necessary. This allows the printbar that holds the printheads to be moved up and away from the web for convenient service, and returned to an extremely reliable printing position when the guide members on the printbar lock into place with the mating alignment members on the printhead alignment fixture. It is important to note that costly advanced motion systems are not being relied upon to achieve accurate positioning in the present invention. Rather, the present invention relies upon the use of mating alignment fixtures constructed of affordable components. In a system such as the present where motion of the system can be imprecise, using such affordable components to accomplish precise printhead positioning, as compared to a system which requires costly precision motion equipment, is highly advantageous.

In furtherance of the above, the printbar of each module is also constructed with a compliant mounting feature which imparts flexibility to the printbar, and effectively allows the printbar to float in place and self-center on the foregoing alignment features when lowered into its printing position. This is achieved by the use of a set of flexible mounting fixtures that secure the print bar to the rest of the printing module. These fixtures allow for a small amount of compression and extension so that the print bar can be leveled in the z plane (parallel to the substrate surface). They also allow minor movement freely in every direction, 360 degrees about the center of the assembly, so that both sides of the printbar can more easily move in the x (down-web direction) and y (cross-web direction) to properly center over the alignment members.

This modular system is an extremely flexible solution that can be used to print on many different application configurations including, without limitation, paper or semi-gloss webs with roll handling, 30 objects on conveyor systems, corrugated manufacturing lines and other product development lines. In each case, the fixed alignment members are mounted on the printhead alignment fixture which extends just above the substrate to be printed on. This sets the print height and position of the print bar. As the substrate passes below this bar, the printheads fire and an image is created. It should be noted that while the printhead alignment fixture extends over the substrate, it is conceivable that the actual positioning of the alignment members carried by the alignment fixture could be located above or below the plane of the substrate, without departing from the scope of the invention herein.

This design takes the complexity and cost out of machining large and extremely accurate printhead arrays, and instead relies on a flexible assembly holding the printheads to drop into a repeatable position. This solution scales very well to larger systems as the cost of the accuracy does not increase as the systems get larger and continues to allow for easy and convenient service of the machine. With the present invention, motion of the printing modules and printing assembly components therein is accomplished using hand operated rails and pneumatic cylinders, which removes the complexity and cost of moving the system to and from an exact position. Traditionally this motion would require precision motion systems which are very expensive, and which increase in cost as the scale and weight of the system increases.

To further facilitate servicing of the individual printing modules and overcome the aforementioned maintenance problems associated with conventional printers having large printhead arrays, each printing module incorporates a uniquely integrated printhead tending system which comprises a compact vacuum knife and printhead capping station. The vacuum knife in each module is mounted on a motorized trolley system such that when the printbar is raised to an elevated servicing position, the vacuum knife may be moved laterally across all printheads, where it pulls dried ink and debris off the printheads without physically touching them. The vacuum knife also has the ability to spray flush fluid up onto the nozzle plates before vacuuming away the excess, to ensure the recessed nozzles are free of dried ink. Both of these functions greatly increase jetting reliability. Since each module accounts for a single color or inkjet fluid, regardless of the cross-web width of the printhead array, the size of the vacuum knife remains the same.

An integrated capping station is also provided for each printing module. The capping station includes a pivotal cap that extends at least the cross-web width of the array of printheads contained within the module. The capping station incorporates the trolley system for the vacuum knife, and may be pivoted between a service/capping position and a non-obstructing print position. When the printbar is elevated to the service position, the capping station may be pivoted under the printheads to allow them to be cleaned by the knife vacuum. Upon completion of the vacuum function, the printbar may then be lowered against the cap, thus allowing the capping station to seal the printheads from the ambient environment. This prevents stray light from slowly curing any ink on the printheads, keeps dust out of the printheads, catches ink after a purge function and generally prevents air from drying out the ink slowly over time. This increases jetting reliability which is critical in single pass applications.

When printing is desired, the capping station, including the vacuum knife, may simply be pivoted to a non-obstructing print position, thus allowing the printbar to be lowered to a print position just above the substrate which is to be printed. The foregoing vacuum/capping features of our modular printhead system are particularly beneficial and unique compared to conventional large multi-color printhead arrays in that incorporating such features does not increase the required footprint of the printer. Where conventional large printers require increasing the footprint proportional to the size of the printhead array to clean and cap all printheads, the foldable capping station and vacuum knife of the present invention are integrated into each module and require no additional offline footprint regardless of print width or number of colors in the system. Therefore, the printhead tending system of the present invention is unique in that it does not require motion or extra space in the cross-web or down-web directions to cover the printheads. This is especially useful when scaling up to wider printing systems where a separate cleaning and capping station would substantially increase the width of an already wide print engine.

The foregoing and additional features and advantages of the present invention will be more readily apparent from the following detailed description. It should be understood, however, that the description and specific examples herein are intended for purposes of illustration only and are not intended to limit the scope of the present disclosure.

DRAWINGS

The drawings described herein are for illustration purposes only and are not intended to limit the scope of the present disclosure in any way.

Figure 15:
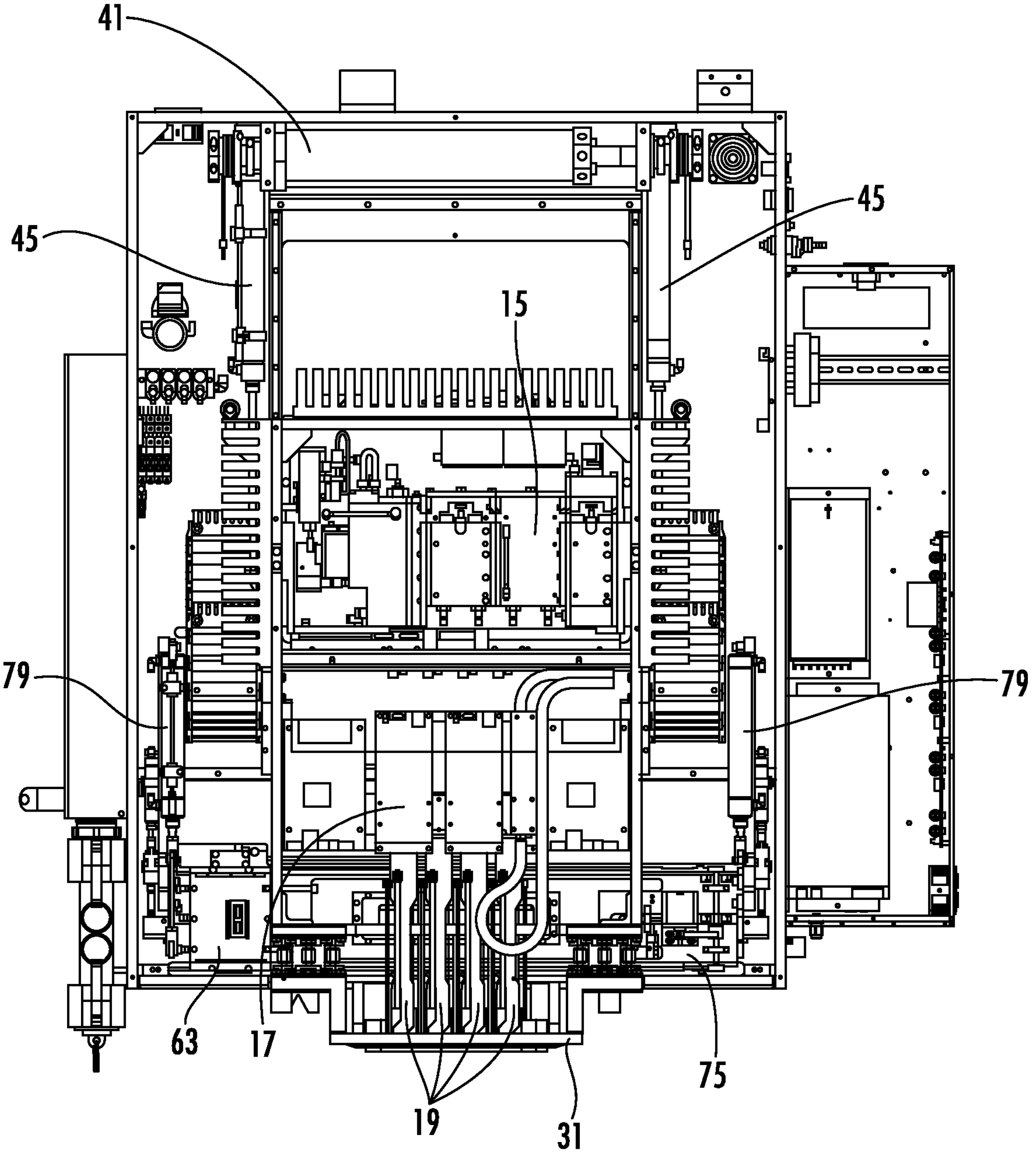
Figure 16:
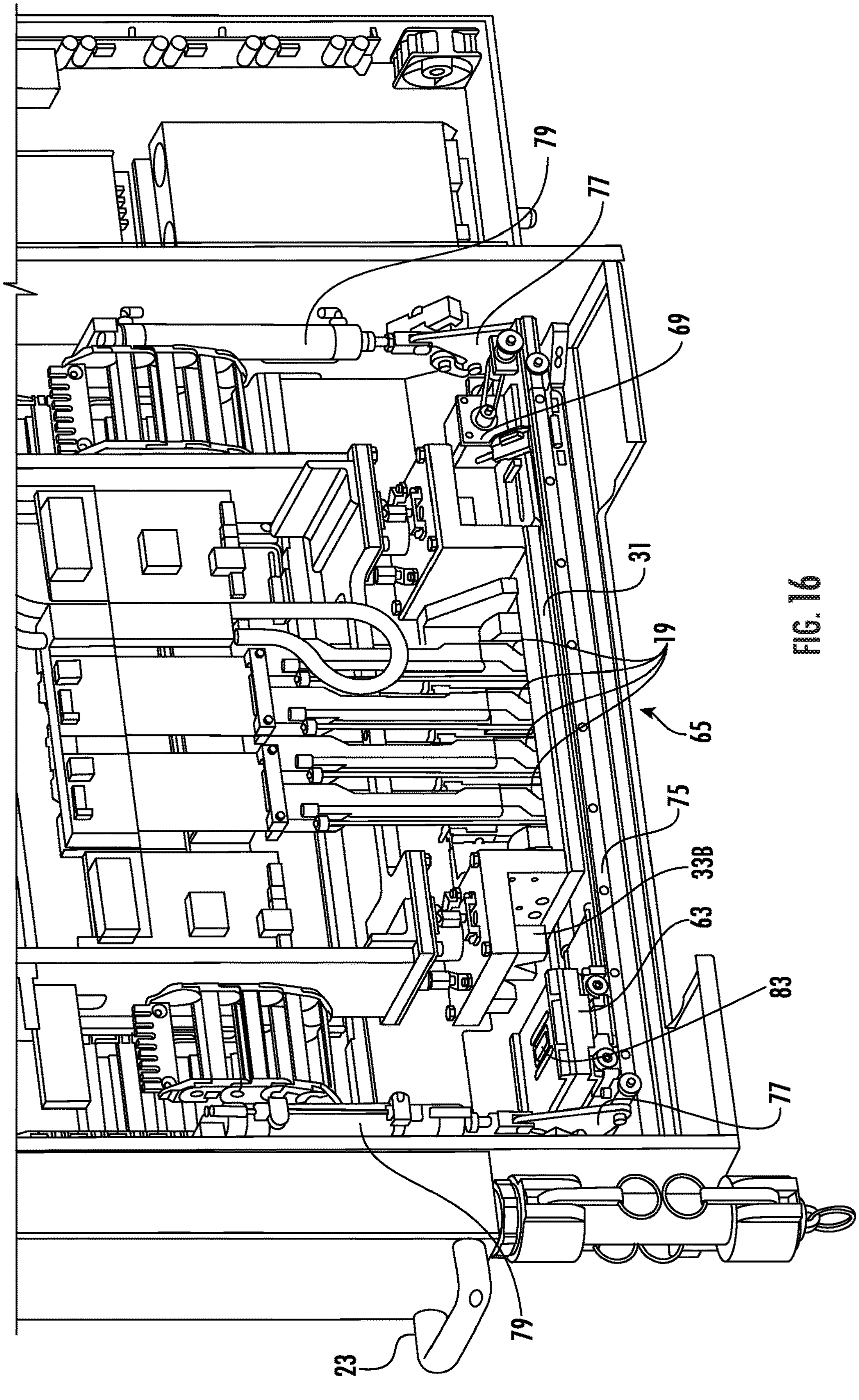

FIG. 15 is a side elevational view of the interior of a printing module, showing the printbar lowered to a printing position for printing on a printable substrate; and FIG. 16 is a close-up isometric view of the interior of a printing module, showing the printbar lowered into its sealed position against the capping station to prevent exposure of the printheads to the ambient environment when not in use.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
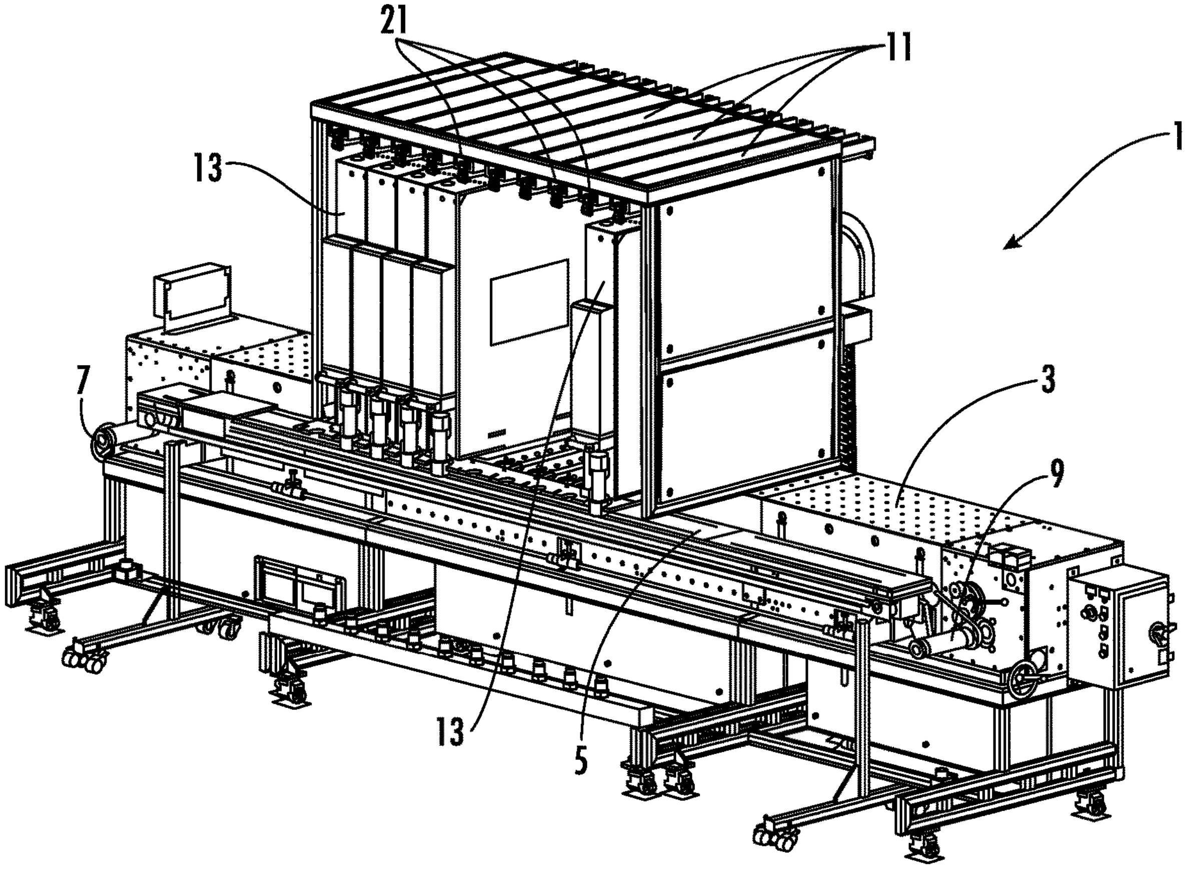
FIG. 1 is an isometric view of a single pass inkjet printer having a plurality of mounting assemblies shown for carrying one or more self-contained single-fluid printing modules constructed in accordance with the present invention.
Figure 2:
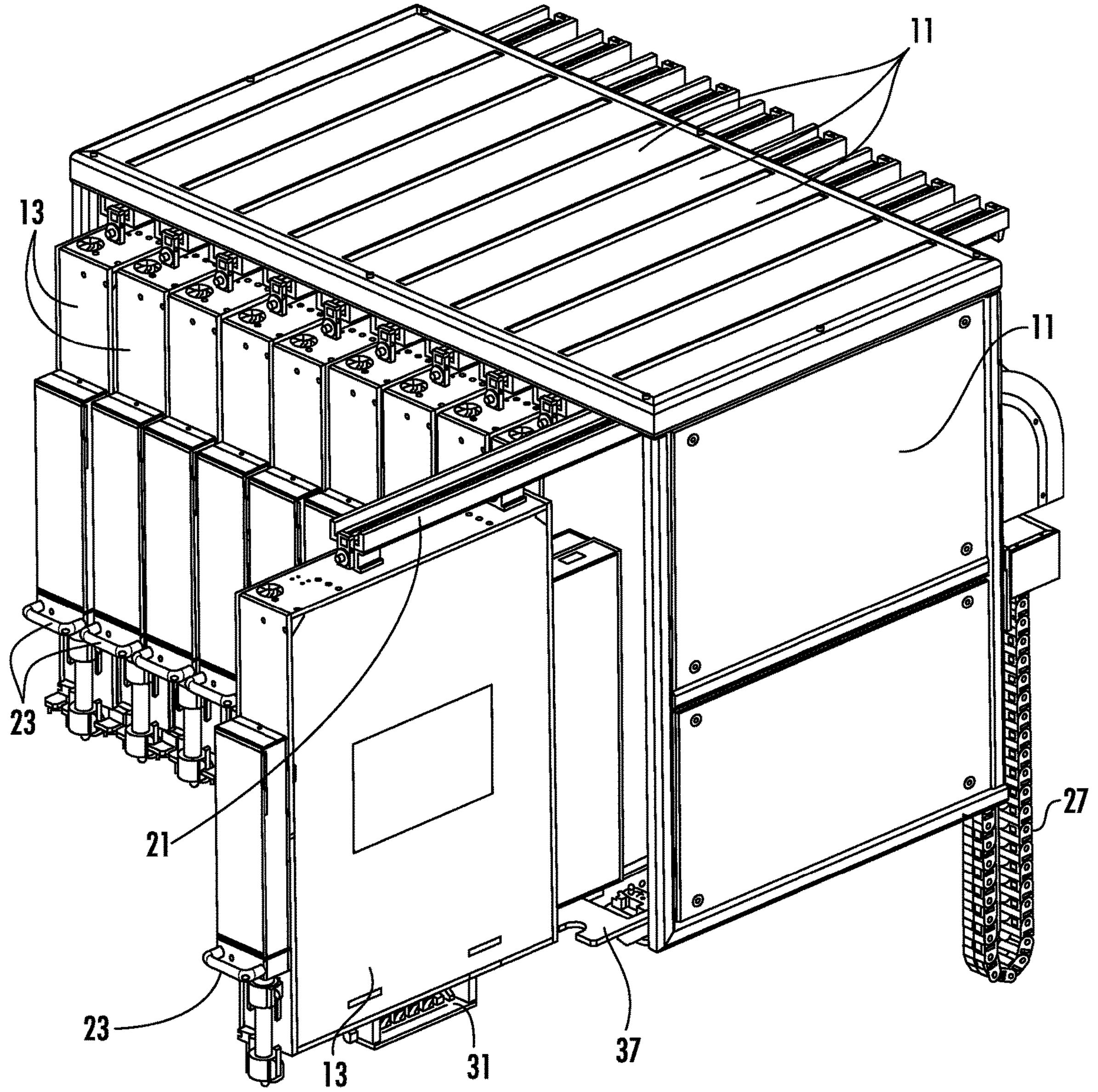
FIG. 2 is an isometric view of the mounting assemblies shown in FIG. 1, each loaded with a self-contained printing module constructed in accordance with the present invention.

With reference now being made to FIGS. 1 and 2 of the drawings, a single pass inkjet printing machine 1 with a modular printhead system is shown constructed in accordance with the present invention. As illustrated in FIG. 1, the printing machine 1 includes a base material handling system 3 having a printing platform 5 over which a web, substrate or other object to be printed upon (not shown) passes during operation. FIG. 1 of the present disclosure shows starter and finishing roller hubs 7 and 9 which may be utilized to carry any suitable web of printing substrate, but it will be appreciated that the present invention is an extremely flexible solution that can be used to print on many different substrates, including but not limited to, paper or semi-gloss webs with roll handling, 3D objects on slide table systems, flat rigid objects on conveyor systems, corrugated manufacturing lines and other product development lines. For illustrative purposes, the present discussion will focus primarily on the inventive concepts in relation to a single-pass inkjet printer, the functional fluid of which is ink. It will be understood, however, that the concepts of the present invention apply equally to applications for printing which may involve the application of other functional fluids, such as varnishes, conductive fluids, conformal coatings, primer and cover coatings, etc.

Figure 3:
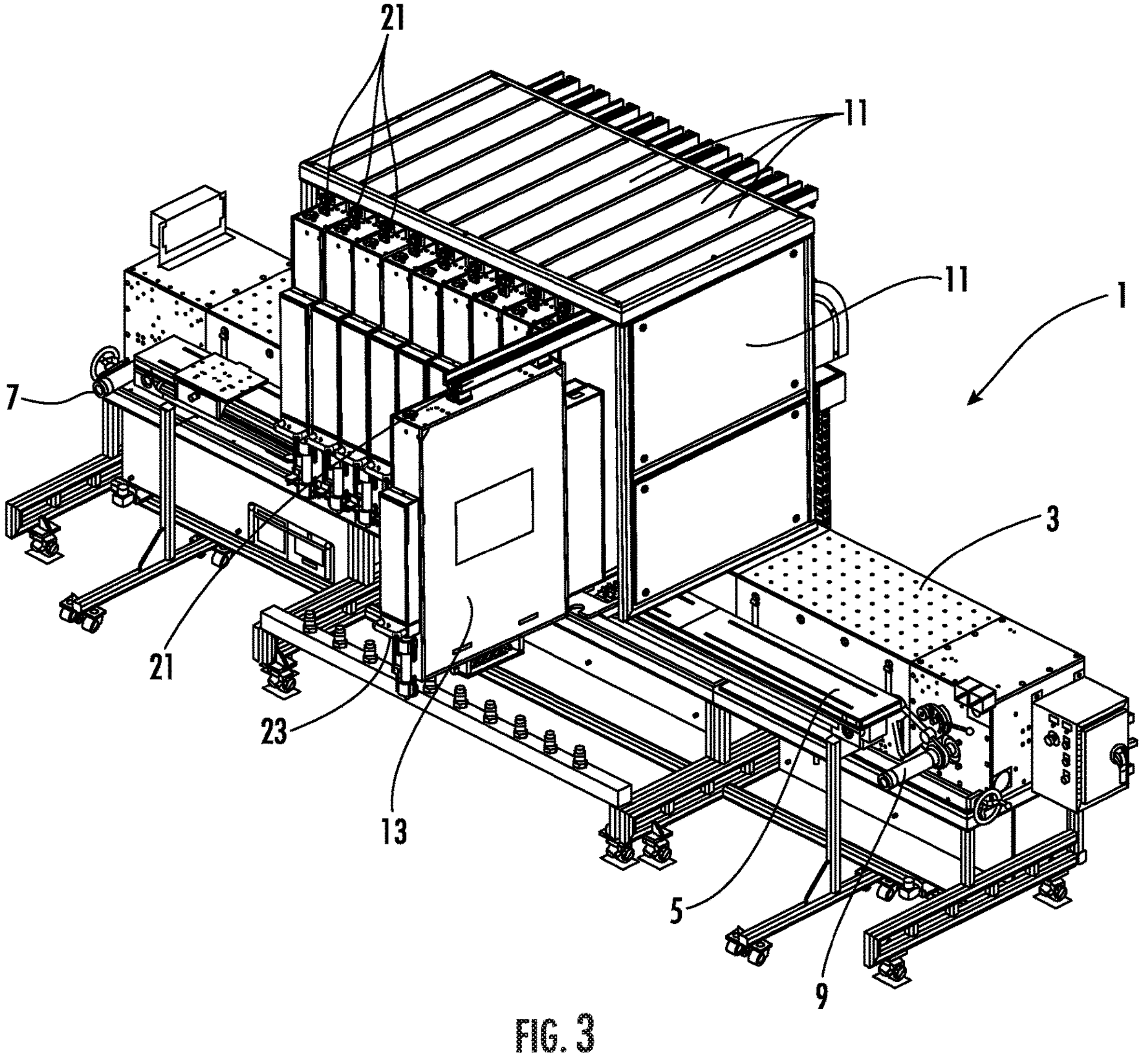
FIG. 3 is an isometric view of a single pass inkjet printer with a single printing module assembly extended, showing the manner in which the printing module moves relative to its respective mounting assembly.
Figure 4:
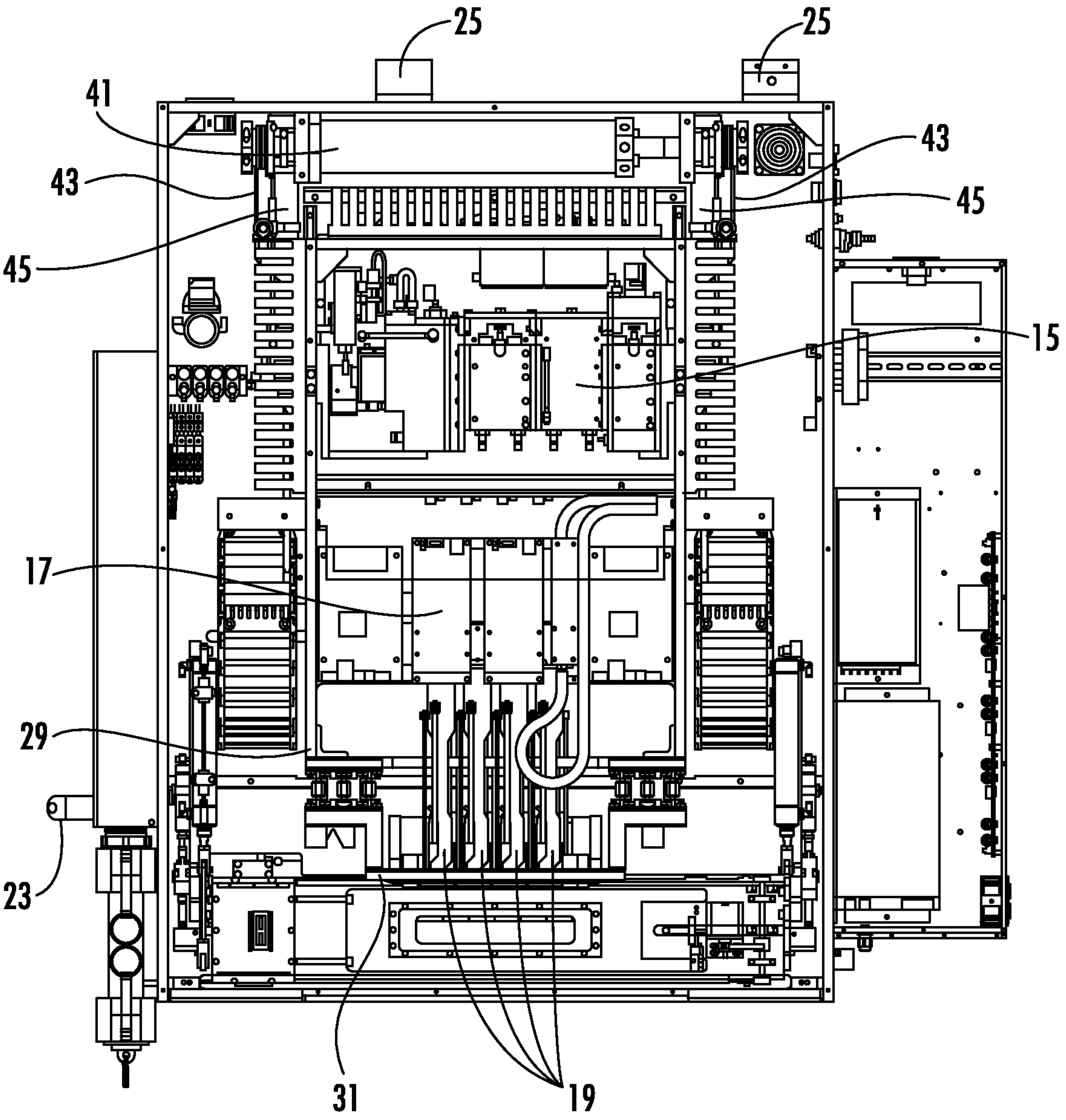
FIG. 4 is a side elevational view of the interior of a self-contained printing module constructed in accordance with the present invention.

As further shown in FIG. 1, one or more mounting assemblies 11 are mounted upon the top of the material handling system 3 and are positioned to rest in home position over printing platform 5 or outward in suspended relation for maintenance. As shown in FIGS. 2 and 3, each mounting assembly 11 is constructed to receive in movable relation a single printing module 13. As shown in FIG. 4, each module 13 is a self-contained printing unit which includes an ink supply 15, printhead drive electronics 17, and a printhead assembly (i.e., printbar 31 and printheads 19), in order to provide one color or fluid of inkjet printing capability. Many systems will incorporate between four and ten of these modules 13 to print many colors, varnish, or other functional fluids. In FIG. 1, the printing system is set up with mounting assemblies 11 to accommodate six printing modules 13, but this is not meant to be limiting in any manner, as the number of printing modules 13 may vary depending upon the given application. As will become more apparent hereafter, each printing module 13 is constructed to be easy to remove and replace from a large printing machine 1, thus resulting in an overall system that is easy to service and maintain.

As seen from FIGS. 2 and 3, each printing module 13 is suspended from a top rail 21 of its respective mounting assembly 11. Top rail 21 is movably mounted within its respective mounting assembly 11 such that it is capable of sliding outwardly from the main body of mounting assembly 11 and material handling system 3. Printing module 13 is also swingably mounted to rail 21 via a pair of bearings 25. Bearings 25 permit the printing module 13 to freely swing back and forth about rail 21 as desired when pulled out into its servicing position. Once pulled out of mounting assembly 11, each printing module 13 is also constructed to be readily removable, as necessary, from rail 21 as a self-contained unit. Therefore, each printing module 13 may be easily moved in and out of its respective mounting assembly 11 for servicing, as necessary.

Each printing module 13 is also built with a movable subassembly 29, including a printbar 31 to which the printheads 19 are mounted. This subassembly 29 is constructed such that the printbar 31 can be easily moved between a raised maintenance/idle position and a lowered printing position. When the subassembly 29 is raised to its elevated maintenance position, the printbar 31 is pulled away from the printing platform 5, and the entire printing module 13 may then be slid out with top rail 21 for easy service or replacement. A cable carrier track 27 which hold cables for the printing module 13 is mounted upon each mounting assembly 11, so the assembly may be moved in and out easily without pulling on or damaging the electrical cables or any other connections in any way. A handle 23 is also provided on the front of each printing module 13 to allow the operator to easily slide the module in and out of its respective mounting assembly 11.

The mechanism for raising and lowering the subassembly 29 within the printing module 13 is best seen in FIG. 4. A preloaded torsion spring 41 is mounted at the upper end of the printing module 13 with cables 43 extending down and attaching to both sides of the subassembly 29. Spring 41 creates a constant upward pulling force sufficient to support about 80% of the weight of the subassembly 29. Two pneumatic cylinders 45 positioned one on either side of the subassembly 29 are then used to raise and lower the subassembly 29 with the aid of spring 41, on demand from the user. With this system, the subassembly 29 (and printbar 31) may be easily raised to its maintenance position, thereby allowing the entire printing module 13 to be slid out upon top rail 21 for easy service or replacement. When printing is desired, the printing module 13 may be easily slid back into its mounting assembly 11, where the subassembly 29 may be lowered into its printing position with the printbar 31 located just above the printing platform 5.

Figure 5A:
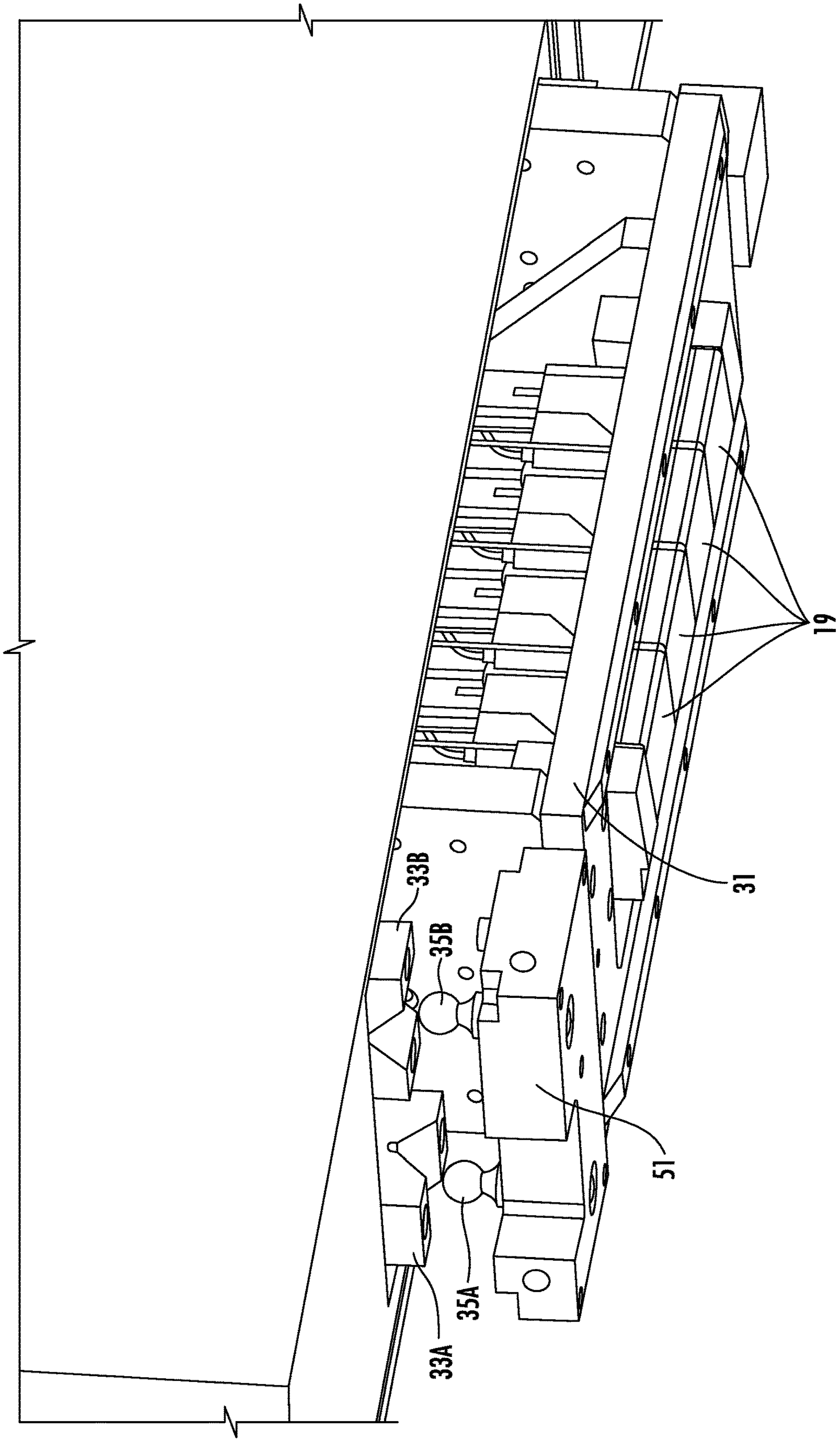
FIG. 5A is a close-up isometric view of one side of the three-point compliant self-aligning mount system used to maintain repeatable precise positioning and registration of the printheads of each printing module.
Figure 5B:
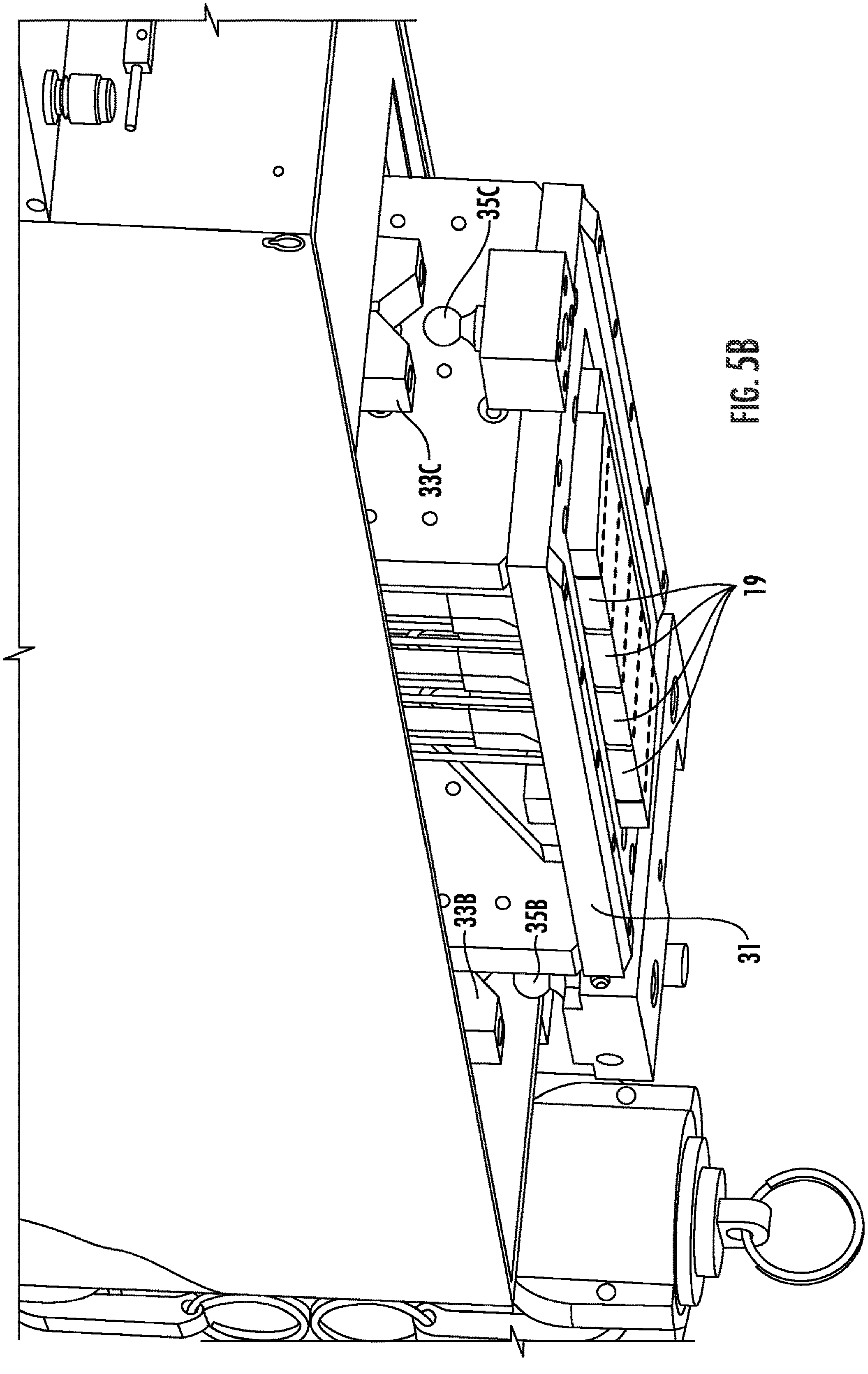
FIG. 5B is a close-up isometric view of the opposite side of the three-point compliant self-aligning mount system shown in FIG. 5A.
Figure 6:
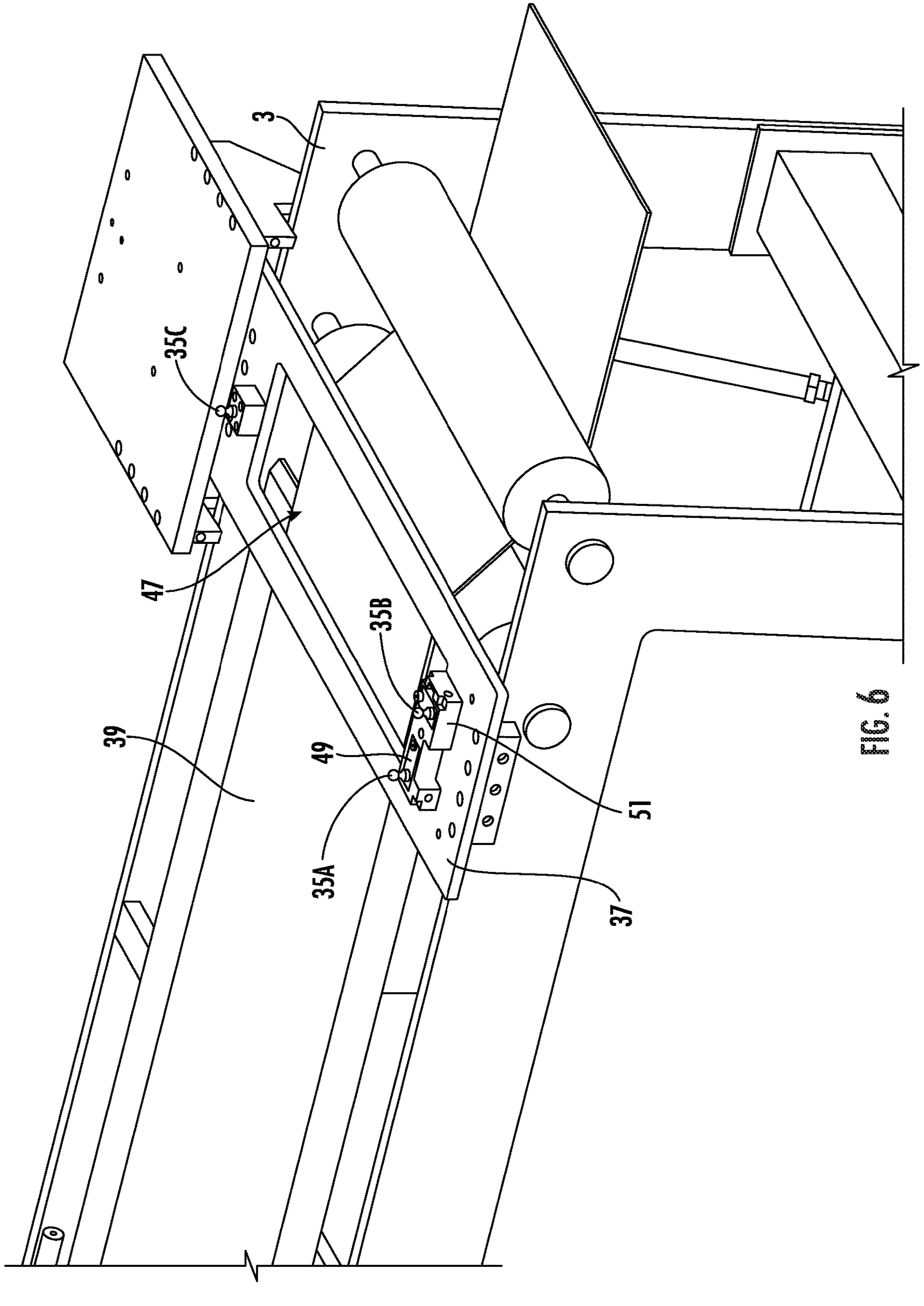
FIG. 6 is a close-up isometric view of the alignment mounting plate used for mounting the adjustable alignment members of the three-point compliant self-aligning mount system for the printheads of each printing module.
Figure 7:
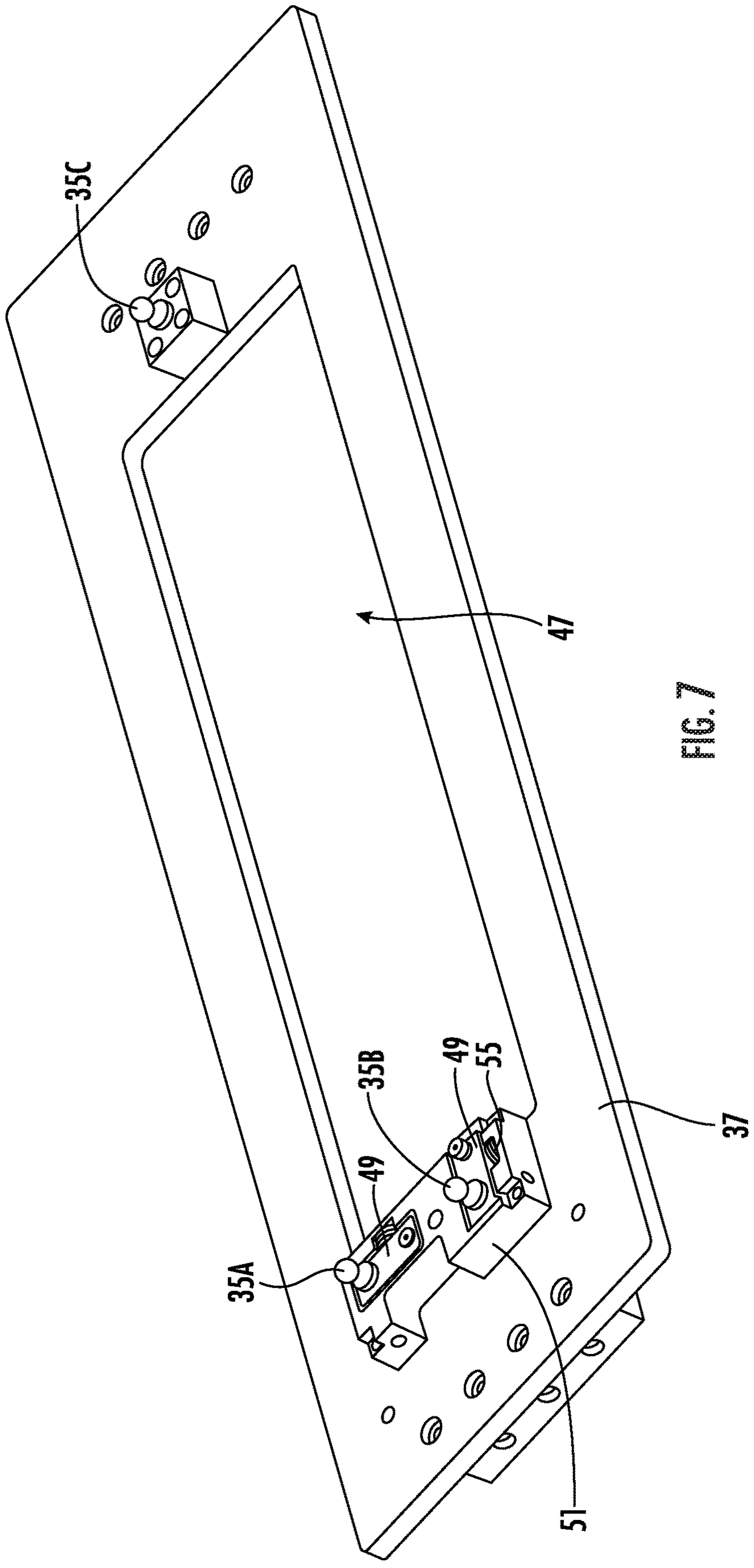
FIG. 7 is a close-up isometric view of the alignment mounting plate shown in FIG. 6.

With each printing module 13 being capable of being easily pulled in and out of its respective mounting assembly 11, it is imperative that the system include an effective means for maintaining accurate printhead positioning upon return of the module 13 to its printing position. To accomplish this, each printing module 13 utilizes a precise compliant mount system to achieve accurate repeatable location and registration of the printheads 19 over the web. As shown in FIGS. 5A and 5B, each subassembly 29 includes a plurality of fixed guide members 33A, 33B and 33C fastened to the bottom of the printbar 31. These guide members 33A, 33B and 33C are located at fixed locations on either side of the printbar 31 so as to mate precisely with corresponding alignment members 35A, 35B and 35C which are carried by an alignment fixture 37 (FIG. 6) that is secured to the material handling system 3. As best shown in FIG. 6, alignment members 35A, 35B and 350 are positioned on the outer boundary portions or opposing sides of the printing substrate or web 39, so as not to interfere with the movement of printbar 31 during operation.

It can be seen further from FIGS. 5A-7 that each alignment member 35A, 35B and 350 is constructed in the form of an upstanding pin having a bulbous or spherically-shaped knob or ball portion formed on the terminal end thereof. For each printing module 13, alignment members 35A, 35B and 35C are mounted to such a printhead alignment fixture 37 which, in turn, is fixedly secured to the material handling system 3 directly below the mounting assembly 11. Alignment fixture 37 extends over the printing platform 5 and includes a web opening 47 extending over the web 39 through which the printbar 31 of module 13 is allowed to pass when lowered into a printing position. As shown, alignment members 35A and 35B are mounted to the printhead alignment fixture 37 on one side of the web opening 47, and alignment member 35C is mounted to the alignment fixture 37 (or directly to a material handling feature in some cases) on the opposite side of the web opening 47.

As seen in FIGS. 5A and 5B, guide members 33A, 33B and 33C are each configured in the form of a V-shaped block which is designed to mate with its respective spherically-shaped alignment member 35A, 35B and 35C when the printing module 13 is lowered to its printing position. As shown in FIG. 5A, guide member 33A is constructed with tapering V-shaped walls branching outwardly in the cross-web direction, whereas the tapering V-shaped walls of guide member 33B extend oppositely in the down-web direction. As shown in FIG. 5B, guide member 33C is also configured with tapering walls extending in the down-web direction, similar to guide member 33B.

Figure 8A:
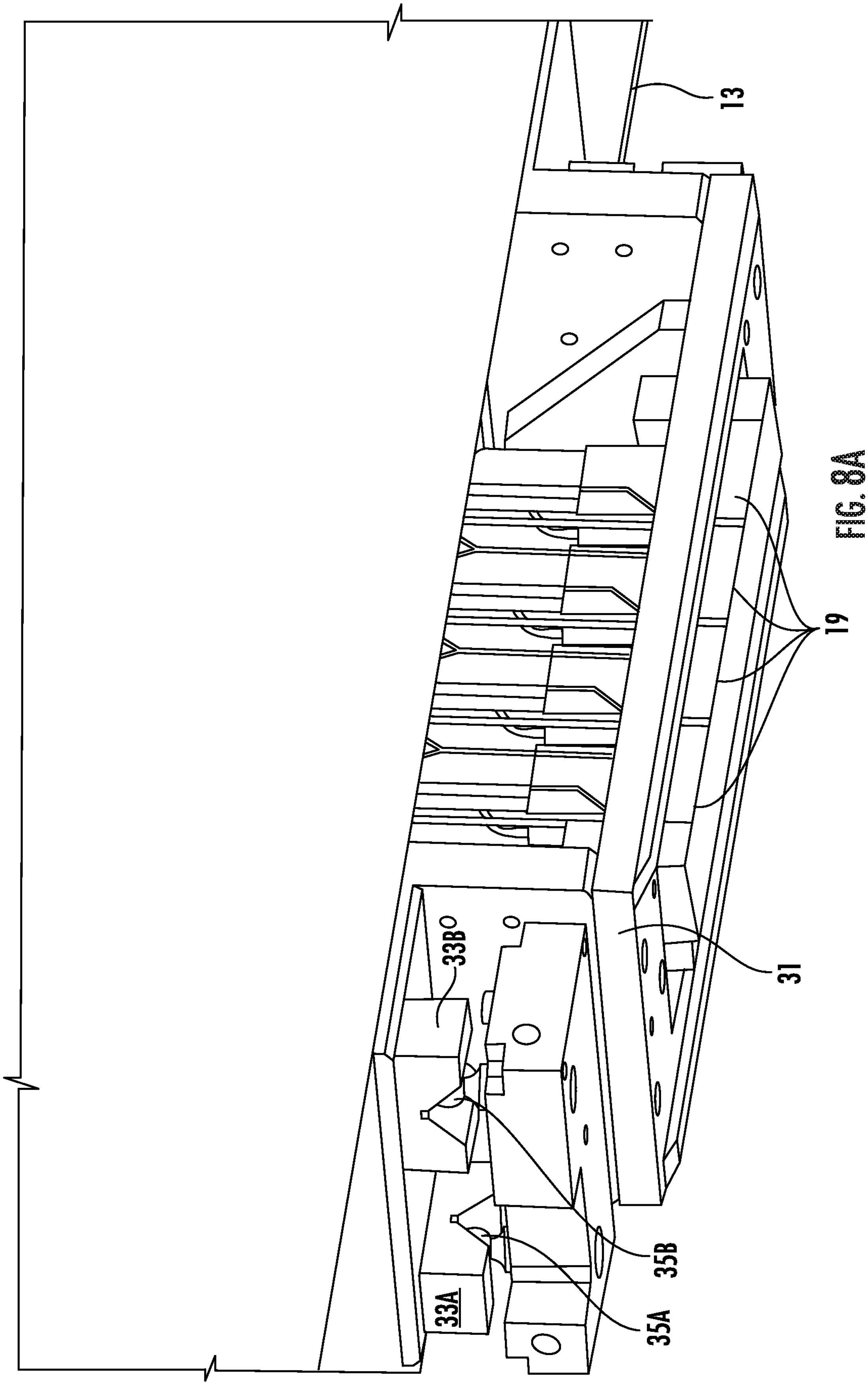
FIG. 8A is a close-up isometric view of one side of the three-point compliant self-aligning mount system, as shown in FIG. 5A, showing the printbar guide members in a seated position upon their respective alignment members.
Figure 8B:
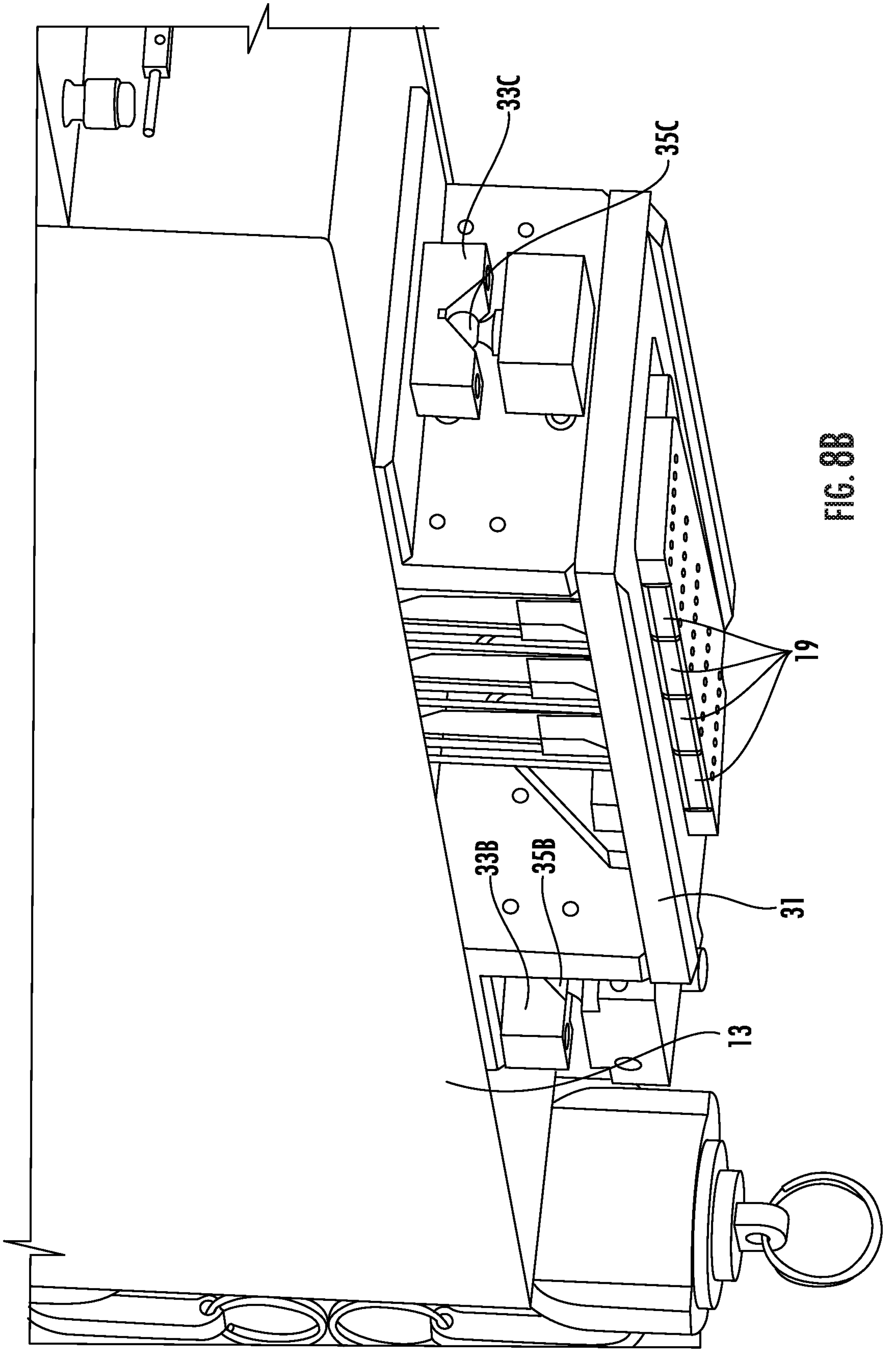
FIG. 8B is a close-up isometric view of the opposite side of the three-point compliant self-aligning mount system shown in FIG. 8A, showing the opposite side printbar guide member seated upon its respective alignment member.

With the above setup, a precision three-point self-centering alignment system for accurately positioning the printheads 19 over web 39 is established. This self-centering alignment can be seen in FIGS. 8A and 8B, where the guide members on the printbar 31 are shown in self-centering engagement with the alignment members 35A, 35B and 350 on the printhead alignment fixture 37 (alignment fixture 37 not shown). Alignment member 350 is fixed in place, and essentially provides a point about which the rest of the printbar 31 may pivot for proper alignment as it is lowered into its printing position. The engagement of opposing tapered walls of guide members 33A and 33B (cross-web vs. down-web) with the spherical ends of alignment members 35A and 35B will automatically cause the printbar 31 to cant and/or pivot about alignment member 35C, thereby forcing the printbar 31 into proper alignment over the web 39. With this system, the tapering walls of each V-shaped guide member 33A, 33B and 33C will engage its respective spherical alignment member 35A, 35B and 35C, and force the printbar 31 into self-centering alignment, precisely and repeatedly to the same position, each time the printing module 13 is lowered into its printing position.

Figure 9:
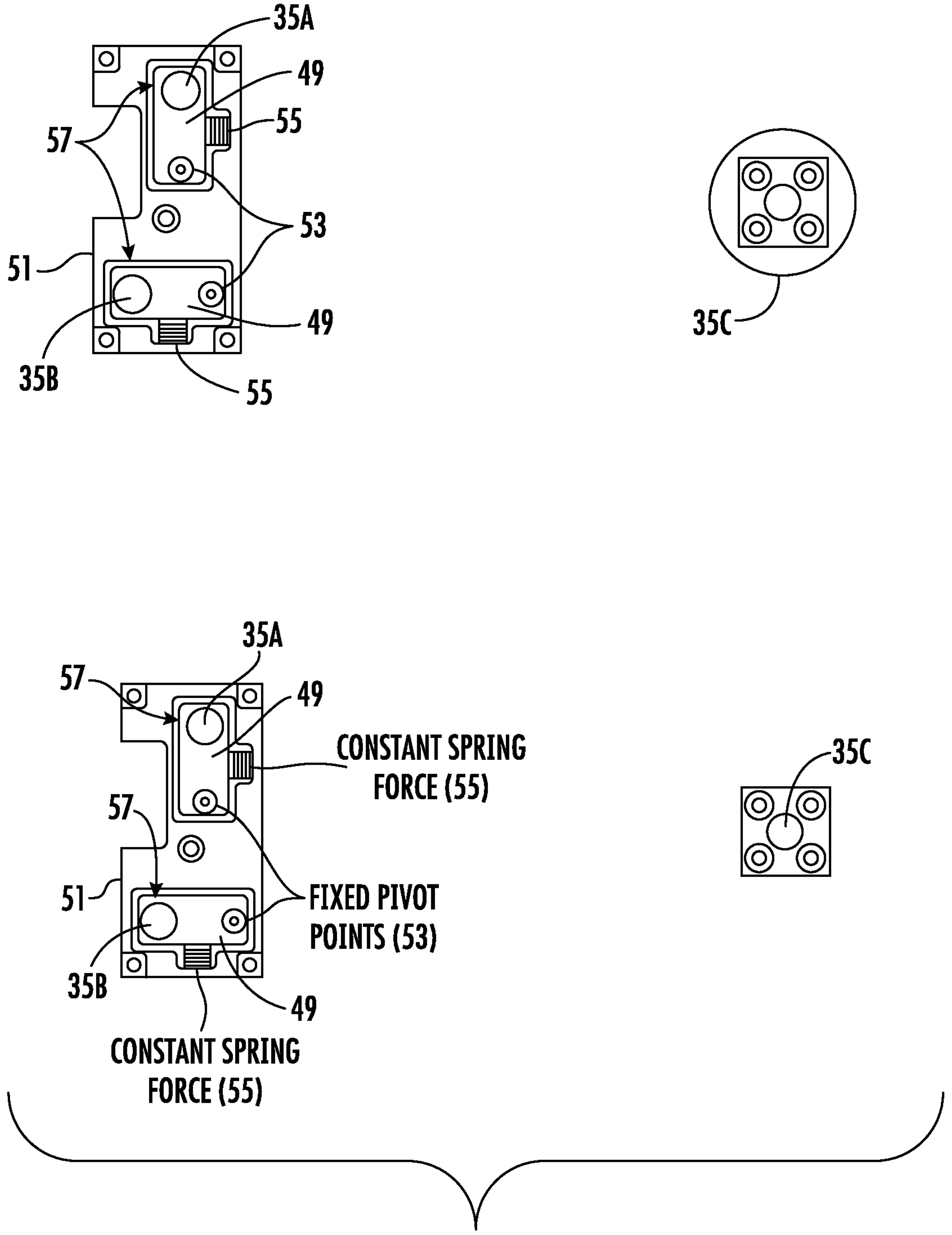
FIG. 9 is a pair of diagrammatic views showing the alignment member adjustment features of the three-point compliant self-aligning mount system for the printheads of each printing module.

As noted above, the alignment member 350 is fixed and not positionally adjustable. Alignment members 35A and 35B, however, each have a fine adjustment feature which allows superfine adjustments to be made, as necessary, to the positioning of the printheads 19 over the web 39. This is best depicted in FIG. 9, where a pair of diagrammatic views illustrate the construction and operation of this fine adjustment feature. As shown, both alignment members 35A and 35B are mounted upon respective movable plates 49. Each plate 49 is, in turn, secured via respective shoulder bolts 53 within a recess in mounting block 51. Each movable plate 49 is allowed to pivot about its respective shoulder bolt 53, and a bias spring 55 provides a constant biasing torque on plate 49 in one direction. A very fine pitch threaded adjustment screw 57 is then provided for each plate 49 to counteract the biasing force of spring 55. By adjusting the adjustment screw 57 in or out for each plate 49, slight positional adjustments can be made to one or both of the alignment members 35A and 35B.

More specifically, adjusting screw 57 for alignment member 35A will cause alignment member 35A to pivot slightly about its shoulder bolt 53 generally in the cross-web direction. This will cause the alignment member 35A to bear against the tapered wall of the V-shaped guide member 33A (which extends in the cross-web direction), thus causing a slight adjustment to the position of the printbar 31, and consequently printheads 19. Similarly, by threading the adjustment screw 57 for alignment member 35B in or out, slight pivotal movement will occur around its shoulder bolt 53 generally in the down-web direction. This will cause the alignment member 35B to bear against the tapered wall of the V-shaped guide member 33B (which extends in the down-web direction), thus causing a slight adjustment to the position of the printbar 31, and consequently the printheads 19. Through the use of such adjustment features, small positional adjustments of the printheads 19 may be made in any direction along the plane of the web 39, as desired or needed.

Figure 10:
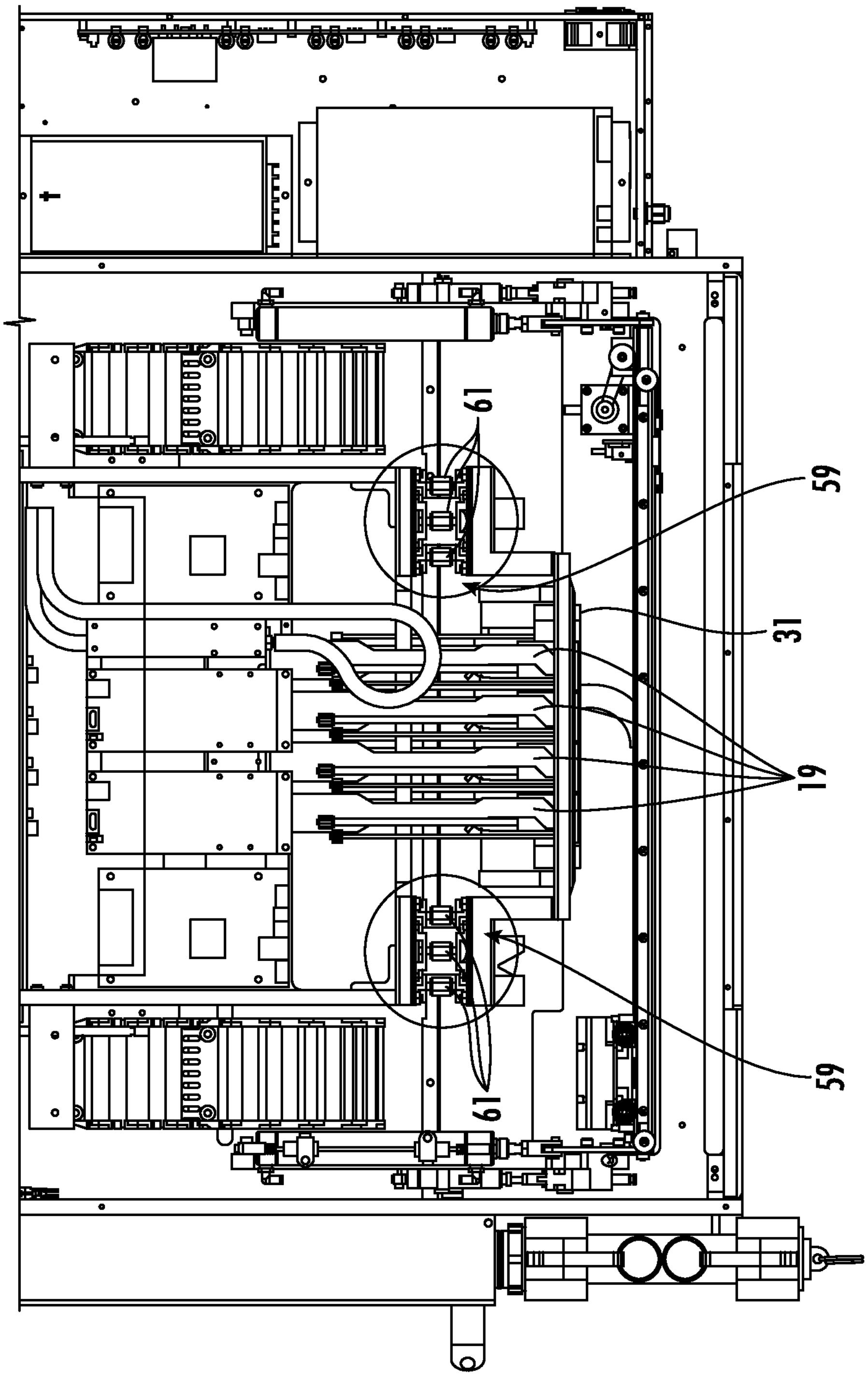
FIG. 10 is a close-up side elevational view of the interior of a printing module, showing a set of flexible mounting fixtures used to impart flexibility to the printbar of each printing module.

In order for the printbar 31 to self-align as discussed above, it is essential that it be flexible in its ability to move in all directions relative to the rest of the subassembly 29. In furtherance of this objective, the printbar 31 of each module 13 is also constructed with a compliant mounting feature which imparts flexibility in the movement of printbar 31, and effectively allows the printbar 31 to float in place and self-center on the alignment members 35A, 35B and 35C when lowered into printing position. As shown best in FIG. 10, this is achieved by the use of a set of flexible coupling devices or mounting fixtures in the nature of remote center compliance devices (RCC) 59. These RCC devices 59 secure the printbar 31 to the rest of the subassembly 29 within the printing module 13, and allow the printbar 31 to become flexible with respect thereto. These ROC devices 59, circled in FIG. 10, incorporate a set of springs 61 that allow for a small amount of compression and extension so that the printbar 31 can be leveled in the z plane (parallel to the substrate surface 39). They also allow movement freely about ¼" in every direction, 360 degrees about the center of the assembly, so that both sides of the printbar 31 can more easily move in the x (down-web direction) and y (cross-web direction), to properly center over the alignment members 35A, 35B and 350.

These RCC devices 59 are used to impart flexibility to the printbar 31 so as to allow the same to compliantly move when necessary to facilitate accurate positioning of the printheads 19 over the web 39, In tandem, these mounting devices 59 allow the entire printbar 31 to center on the alignment members 35A, 35B and 35C, and can be used with any size and number of print modules to resolve the long-standing problem of high cost mounting and positioning systems for large-scale accurate printing machines.

Figure 11:
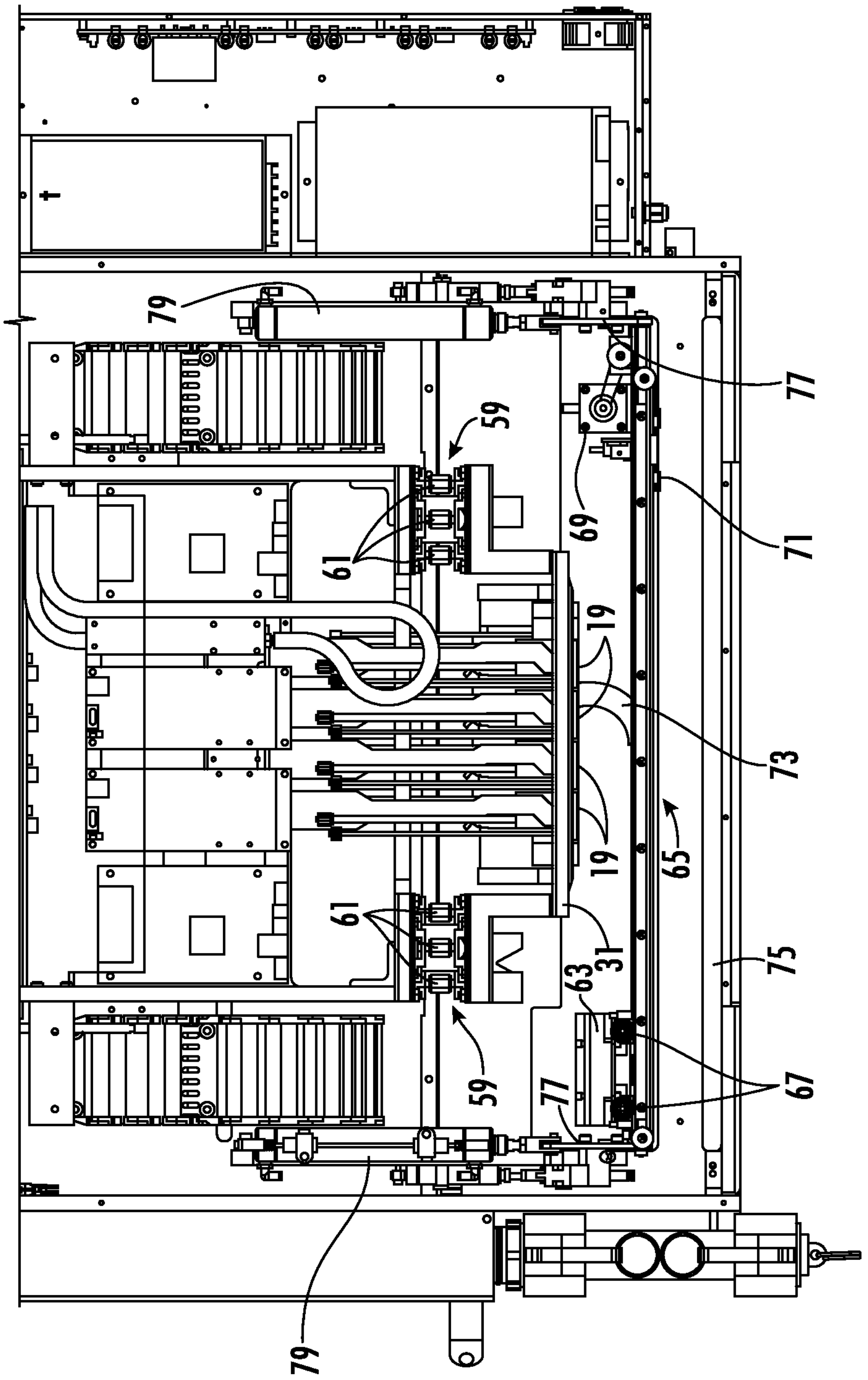
FIG. 11 is a close-up side elevational view of the interior of a printing module, showing the integrated printhead tending system used for cleaning and capping the printheads of each printing module.
Figure 12:
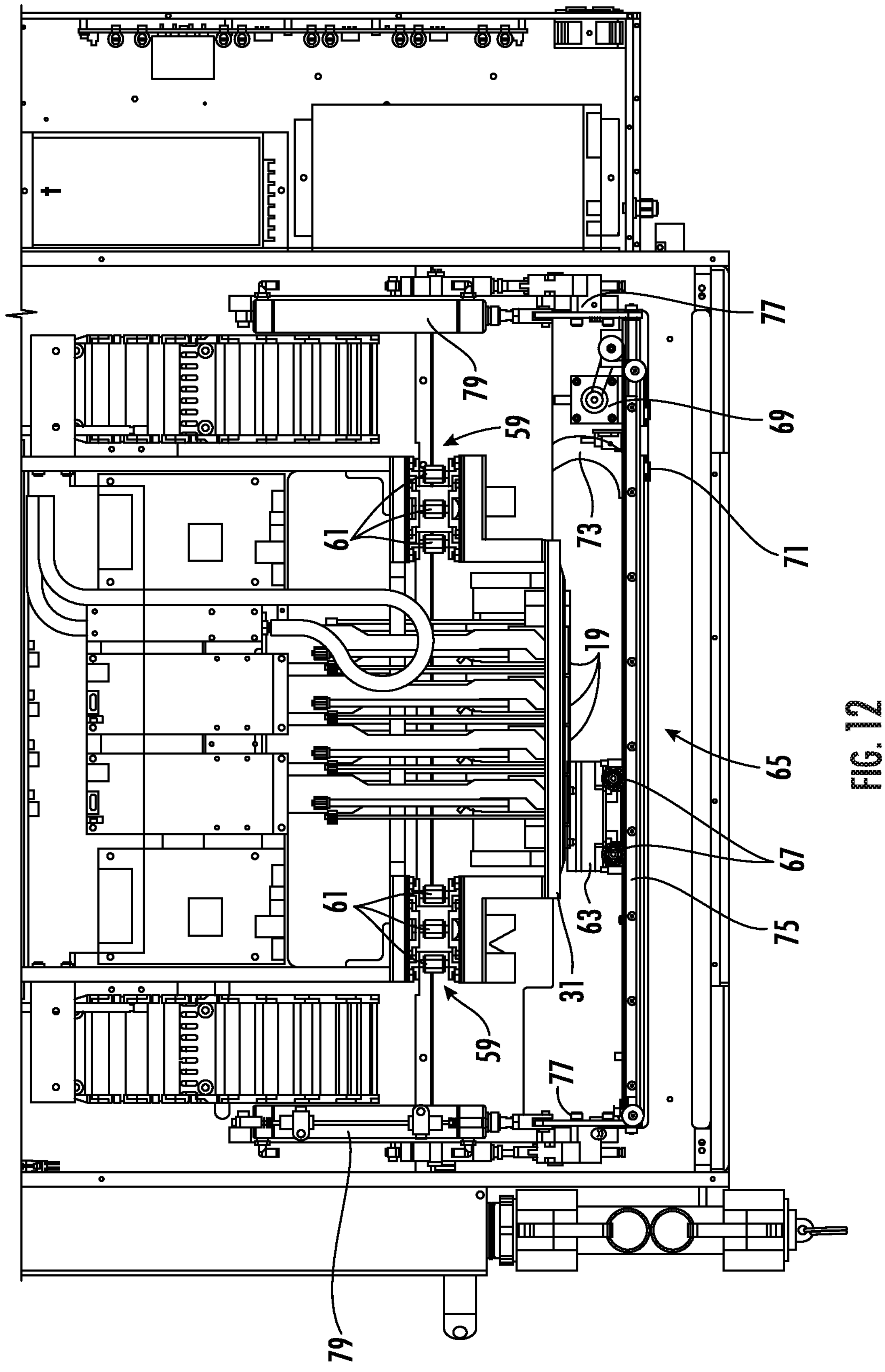
FIG. 12 is another close-up side elevational view of the interior of a printing module, showing the manner in which the vacuum knife of the integrated printhead tending system moves across the printheads to clean the same.

As noted previously, servicing the individual printing modules 13 is made easy due to the flexibility and freedom of movement of each module and its ability to be slid out upon top rail 21 for easy service or replacement. To further facilitate servicing of the individual printing modules 13 and overcome the aforementioned maintenance problems associated with conventional printers having large printhead arrays, each printing module 13 incorporates a uniquely integrated printhead tending system. As shown in FIGS. 11 and 12, this tending system includes a compact vacuum knife 63 for cleaning the printheads 19, and a printhead capping station 65 which seals and protects the printheads 19 from the ambient environment when not in use.

Figure 13:
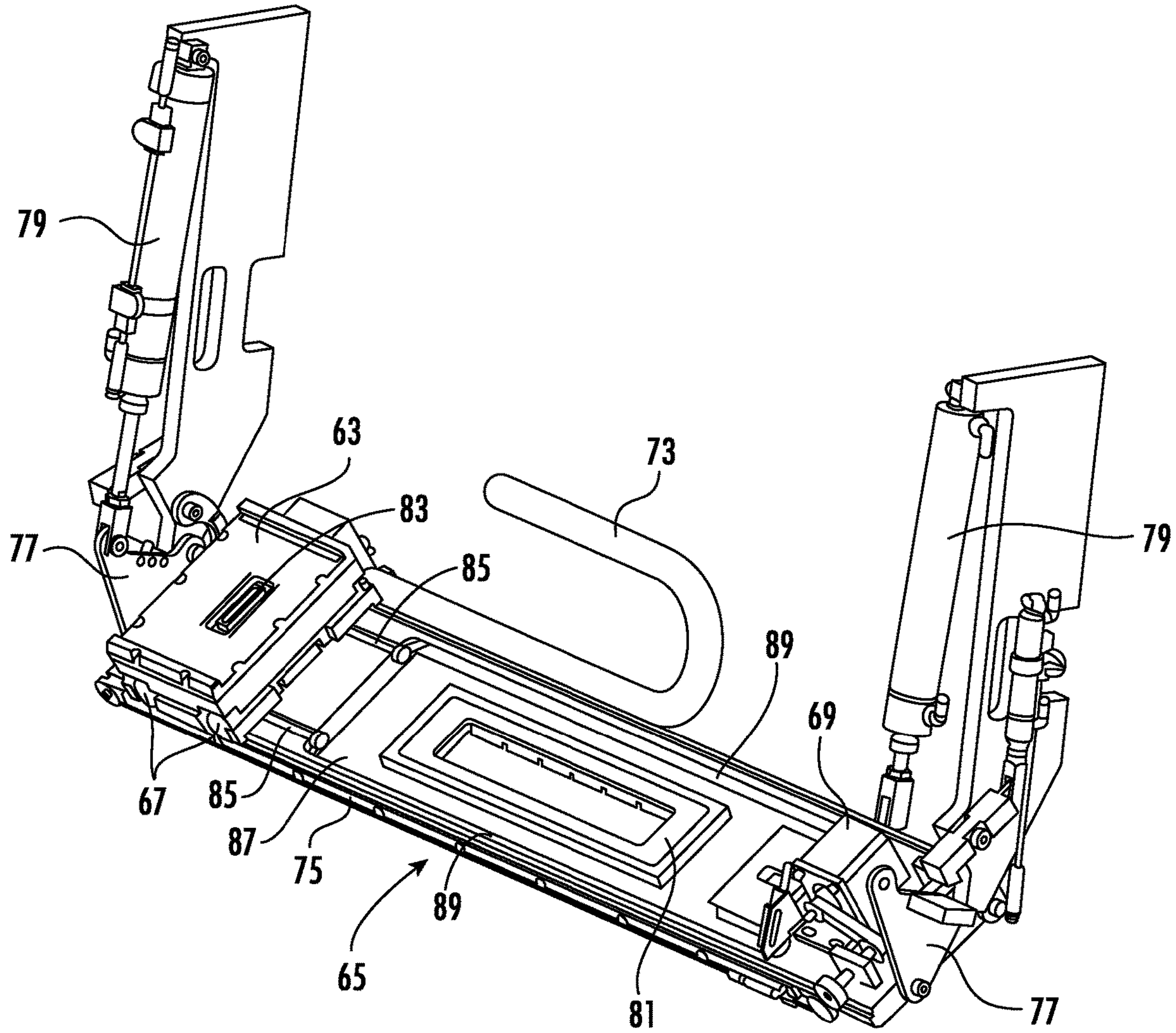
FIG. 13 is a close-up isometric view of the printhead capping station of the integrated printhead tending system used for cleaning and capping the printheads of each printing module.

As shown in FIGS. 11-1 the vacuum knife 63 of each module 13 is constructed in the form of a trolley cart with wheels 67 that moves along a track formed in the capping station 65. A close-up of the capping station 65 and vacuum knife 63 mounted thereon is shown in FIG. 13. It can be seen that a motor 69 and cable system 71 is connected to the vacuum knife 63 to facilitate movement of the vacuum knife 63 back and forth along the capping station 65. Therefore, as best seen in FIG. 12, when the printbar 31 is raised to an elevated servicing position, the vacuum knife 63 may be moved laterally in the cross-web direction across all printheads 19.

As the vacuum knife 63 transitions across the printheads 19, it has the ability to spray flush fluid up through one or more outlet ports 83 located in the top surface of the vacuum knife 63 onto the nozzle plates of the printbar 31 before vacuuming away the excess debris, thereby ensuring the recessed nozzles are free of dried ink. The capping station 65 also incorporates a pump with suction nozzles 85 that protrude into the capping station 65. This pump is adapted to pump away any excess fluid through nozzles 85 that pools in the capping station 65 during a flush or purge operation, or other function.

Once flushing of the printheads 19 is complete, the vacuum knife sucks the dried ink and debris off the printheads 19 without physically touching them. The debris that is collected from the printheads 19 is then discharged through flexible hose 73 to a collection container (not shown), As best seen in FIG. 13, since each printing module 13 accounts for a single color or inkjet fluid, regardless of the cross-web width of the printhead array, the size of the vacuum knife 63 remains the same.

Figure 14:
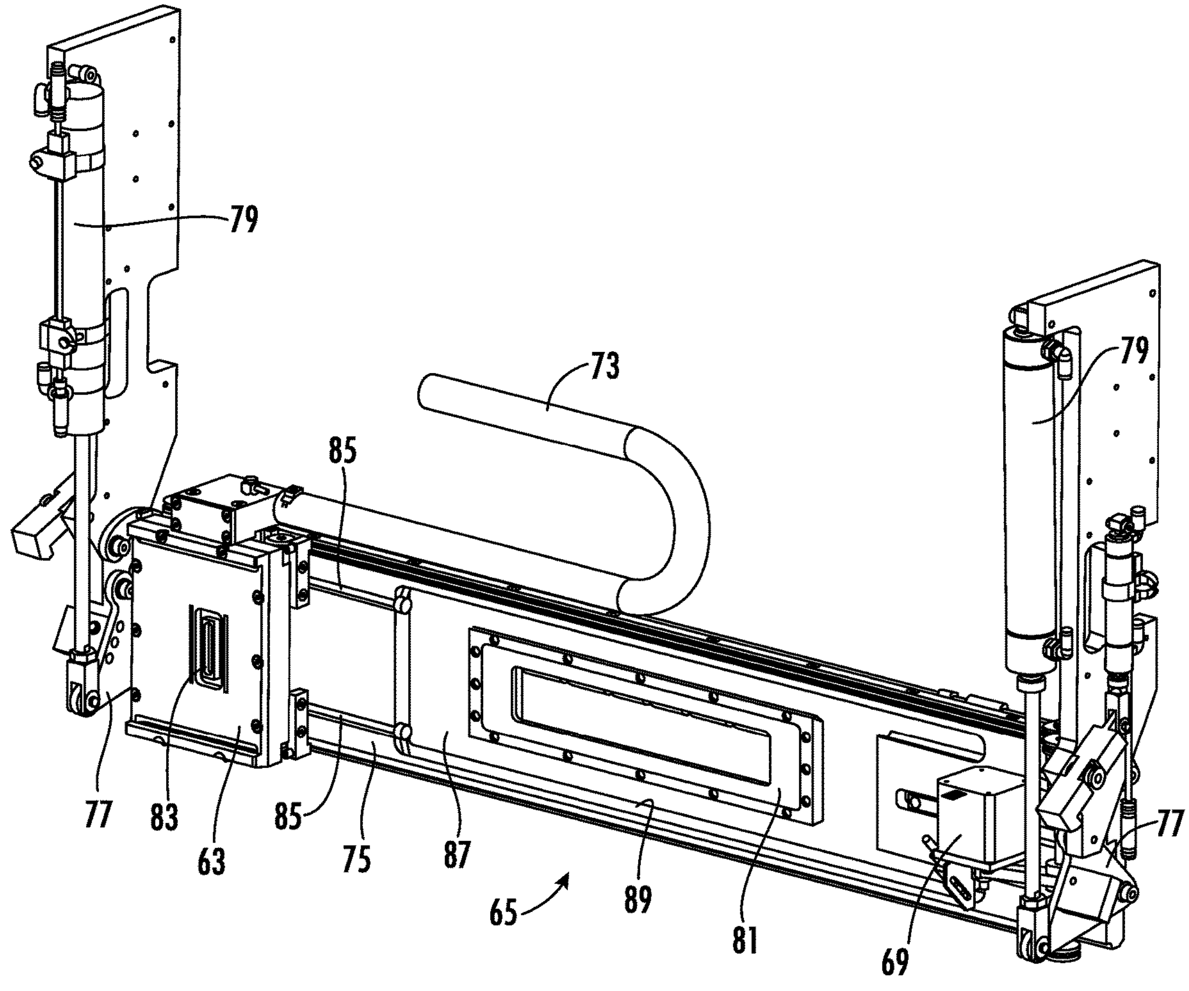
FIG. 14 is another close-up isometric view of the printhead capping station shown in in FIG. 13, showing how the capping station of the integrated printhead tending system may be pivoted and folded away to permit the printbar to lower to its printing position.

Also depicted in FIGS. 11-13, the capping station 65 is comprised basically of an elongated lower cap or panel 75 which extends at least the width of printbar 31 in the cross-web direction and is pivotally mounted to part of the subassembly 29 via linkage 77 and pneumatic pistons 79. As shown, pistons 79 connect to linkage 77 on opposite sides of the capping station 65 so as to effect pivotal movement of the cap 75 between a closed service/capping position (FIGS. 11-13) and a non-obstructing open print position (FIGS. 14-15).

As further shown, the central portion of cap 75 is recessed at 87 and includes a seal 81 for sealing off the printheads when not in use. As best shown in FIGS. 13 and 14, a pair of suction pump nozzles 85 extends into the recessed portion 87 to facilitate removal of any excess fluids which may have accumulated therein during a cleaning cycle, etc. As seen, the outer edges 89 of recessed portion 87 are formed to create a peripheral trough for the collection of such fluids, and nozzles 85 are positioned to extend into the corners of such trough to suction any accumulated fluid therefrom.

As shown in FIG. 16, with the cap 75 pivoted to its closed servicing/capping position, printbar 31 may be lowered to bear against seal 81 of the capping station 65, thus capping printheads 19 and protecting them from ambient environment conditions. As noted earlier, this prevents stray light from slowly curing any ink on the printheads 19, keeps dust out of the printheads 19, catches ink after a purge function and generally prevents air from drying out the ink slowly over time. Therefore, when servicing the printheads 19 is complete, the printbar 31 may be lowered further such that the printheads 19 are sealed by the capping station 65 and protected from the ambient environment.

The capped position allows the system to be stored when not in use and allows the printheads 19 to undergo a purge cycle, forcing ink through nozzles to clear them of blockages. This increases jetting reliability while maintaining serviceability, which is critical in single pass applications. When printing is desired, the capping station 65, including the vacuum knife 63, may simply be pivoted and folded rearward to a non-obstructing print position (FIGS. 14-15), thus allowing the printbar 31 to be lowered to a print position just above the substrate 39 which is to be printed.

Upon pivoting cap 75 back to its open position, the printbar 31 may be lowered to its print position directly above the printing platform 5 which carries a printable substrate 39. In this position, as shown in FIG. 15, both the cap 75 and the knife vacuum 63 fold rearward to an out-of-the-way position, thereby allowing the printbar 31 to be lowered in the manner described above to its print position.

The foregoing vacuum/capping features of our modular printhead system 1 are particularly beneficial and unique compared with conventional large multi-color printhead arrays in that incorporating such features do not increase the required footprint of the printer. Regardless of the cross-web width of the printhead array in module 13, the vacuum knife 63 is the same size. For example, using a conventional large printhead array design, a two-foot wide printer would not only require two feet for the printhead array, but an additional two feet offline (in the cross-web direction) to facilitate cleaning and capping the printheads. Thus, a two-foot wide printer requires four feet of space to allow for cleaning and capping of the printheads. Scaling up, four feet of printing requires eight feet of space. With the present modular printhead system 1, a two-foot wide printer requires no additional offline footprint, as each printing module 13 includes its own printhead tending system that requires no additional offline footprint to employ.

Therefore, where conventional large printers require increasing proportionally the size of the entire printhead array to clean and cap all printheads, the pivotal capping station 65 and vacuum knife 63 of the present invention are integrated into each printing module 13. The entire printhead tending system folds upright inside each printing module 13 such that no additional outside area is required to incorporate such features. Therefore, the printhead tending system of the present invention is unique in that it does not require movement or extra space in the cross-web or down-web directions to cover the printheads. This is especially useful when scaling up to wider printing systems where a separate cleaning and capping station would increase the width of an already wide print engine.

This modular system is an extremely flexible solution that can be used to print on many different substrates including, without limitation, paper or semi-gloss webs with roll handling, 3D objects on conveyor systems, corrugated manufacturing lines and other product development lines. In each case, the fixed alignment members 35A, 35B and 350 mounted on the head alignment fixture 37 sets the print height and position of the printbar 31 just above the substrate to be printed on. As the substrate passes below the printbar 31, the printheads 19 fire and an image is created. When maintenance is required, the printbar 31 may be lifted to a service position and the entire module 13 may be moved outward from within its mounting assembly 11 for servicing. Servicing and capping of the printheads 19 of each printing module 13 is made easy using the integrated printhead tending system incorporated into each module.

This design takes the complexity and cost out of machining large and extremely accurate printhead arrays or precision motion systems, and instead relies on a flexible assembly holding the printheads 19 to drop into a repeatable position. This solution scales very well to larger systems as the cost of the accuracy does not increase as the systems get larger and continue to allow for easy and convenient service of the machine.

The disclosure herein is intended to be merely exemplary in nature and, thus, variations that do not depart from the gist of the disclosure are intended to be within the scope of the disclosure. Such variations are not to be regarded as a departure from the spirit and scope of the disclosure, which comprises the matter shown and described herein, and set forth in the appended claims.

The invention claimed is:

1. A mobile printhead cleaner for a print module, comprising:

(a) a printing apparatus having a print module with an array of printhead fluid dispensers;

(b) a printhead cleaning member movably connected to said print module and being transitional between a cleaning position for said printhead fluid dispensers and a non-obstructing storage position relative to said printhead fluid dispensers;

(c) said cleaning member upon activation being constructed to travel across said printhead fluid dispensers and remove accumulated debris therefrom;

(d) said cleaning member upon deactivation being constructed to transition to said non-obstructing storage position relative to said printhead fluid dispensers so as to permit printing therewith;

(e) said cleaning member being carried on a printhead capping panel which enables said printhead fluid dispensers to be covered when not in use;

(f) said cleaning member and said capping panel transition together between said cleaning position and said storage position; and (g) said print module having a defined outer confines, and said cleaning member and said capping panel remaining within said outer confines of said print module during transition between said cleaning position and said storage position.

2. The mobile printhead cleaner of claim 1, wherein said cleaning member includes a vacuum knife which travels in close relation to said array of printhead fluid dispensers and removes accumulated debris therefrom via suction without physically touching said printhead fluid dispensers.

3. The mobile printhead cleaner of claim 2, wherein said cleaning member includes a motorized cart which carries said vacuum knife across said printhead fluid dispensers when activated.

4. The mobile printhead cleaner of claim 1, wherein said print module defines a general plane for printing on a printable substrate, and said cleaning member is pivotal between said cleaning position and said storage position about an axis that is generally parallel to said printing plane.

5. The mobile printhead cleaner of claim 1, wherein said cleaning member is constructed to reciprocate back and forth across said array of printhead fluid dispensers upon activation thereof.

6. The mobile printhead cleaner of claim 1, wherein said printing apparatus includes a plurality of said print modules, and each of said print modules has its own said cleaning member constructed to travel across and clean said printhead fluid dispensers thereof.

7. The mobile printhead cleaner of claim 6, wherein said cleaning member of each of said print modules is pivotal between its said cleaning position and said non-obstructing storage position.

8. The mobile printhead cleaner of claim 6, wherein said cleaning member of each said printing module is comprised of a traveling vacuum which is capable of reciprocal movement back and forth across said array of printhead fluid dispensers.

9. The mobile printhead cleaner of claim 6, wherein each said print module defines a general plane for printing on a printable substrate, and said cleaning member for each said print module is pivotal between its said cleaning position and its said storage position about an axis that is generally parallel to said printing plane.

10. The mobile printhead cleaner of claim 1, wherein said cleaning member includes a fluid spray mechanism which is positioned and adapted for spraying a fluid upon said array of printhead fluid dispensers to flush accumulated debris therefrom.

11. A mobile printhead cleaner for a print module, comprising:

(a) a printing apparatus having a print module extending over a movable printable substrate, said print module including an array of printhead fluid dispensers arranged to traverse said printable substrate as said substrate moves thereunder;

(b) a motorized printhead cleaning member movably connected to said print module, said printhead cleaning member being pivotal between a cleaning position located underneath said printhead fluid dispensers and a non-obstructing storage position relative to said printhead fluid dispensers;

(c) said cleaning member upon activation being constructed to travel across said printhead fluid dispensers in a direction transverse to a principal direction of movement of said movable printable substrate and remove accumulated debris from said printhead fluid dispensers;

(d) said cleaning member upon deactivation being constructed to transition to said non-obstructing storage position relative to said printhead fluid dispensers so as to permit printing therewith; and (e) said cleaning member being carried on a pivoting printhead capping panel which enables said printhead fluid dispensers to be covered when not in use, said cleaning member and said capping panel being confined within said print module during transition between said cleaning position and said storage position.

12. The mobile printhead cleaner of claim 11, wherein said cleaning member is comprised of a motorized cart which carries a vacuum, said cart being constructed to travel along said array of printhead fluid dispensers when in said cleaning position and remove accumulated debris therefrom via suction without physically touching said printhead fluid dispensers.

13. The mobile printhead cleaner of claim 11, wherein said printing apparatus includes a plurality of said print modules, and each of said print modules has its own said motorized printhead cleaning member in the form of a vacuum which is constructed to reciprocate back and forth across said printhead fluid dispensers thereof when activated.

14. The mobile printhead cleaner of claim 11, wherein said cleaning member includes a fluid spray mechanism which is constructed to spray a fluid upon said array of printhead fluid dispensers to flush accumulated debris therefrom when said cleaning member travels across said printhead fluid dispensers.

15. A mobile printhead cleaner for a print module, comprising:

(a) a printing apparatus having a plurality of individual print modules extending over a movable printable substrate, each of said print modules being readily removable from said printing apparatus as a self-contained unit;

(b) each of said print modules including:

(1) an array of printhead fluid dispensers arranged to traverse said printable substrate as said substrate moves thereunder;

(2) a motorized printhead cleaning member movably connected to said print module, said printhead cleaning member being transitional between a cleaning position located underneath said printhead fluid dispensers and a upright storage position away from said printhead fluid dispensers;

(3) said cleaning member upon activation being constructed to travel across said printhead fluid dispensers and remove accumulated debris therefrom;

(4) said cleaning member upon deactivation being constructed to transition to said non-obstructing storage position relative to said printhead fluid dispensers so as to permit printing therewith;

(5) said cleaning member being carried on a printhead capping panel which enables said printhead fluid dispensers to be covered when not in use; and (c) said cleaning member of each said print module being carried on a pivoting printhead capping panel which enables said printhead fluid dispensers thereof to be covered when not in use, said cleaning member and said capping panel together being movable between said cleaning position and said storage position as a unit.

16. The mobile printhead cleaner of claim 15, wherein said cleaning member of each said print module is pivotal between said cleaning position and said storage position about an axis that is generally transverse to said movable printable substrate.

17. The mobile printhead cleaner of claim 16, wherein said cleaning member of each said print module is comprised of a motorized cart which carries a vacuum, said cart being constructed to travel along said array of printhead fluid dispensers when in said cleaning position and remove accumulated debris therefrom via suction without physically touching said printhead fluid dispensers.

18. The mobile printhead cleaner of claim 15, wherein said cleaning member of each said print module includes a fluid spray mechanism which is positioned and adapted for spraying a fluid upon said array of printhead fluid dispensers thereof to flush accumulated debris therefrom.

19. A mobile printhead cleaner for a print module, comprising:

(a) a printing apparatus having a print module with an array of printhead fluid dispensers;

(b) a printhead cleaning member movably connected to said print module and being transitional between a cleaning position for said printhead fluid dispensers and a non-obstructing storage position relative to said printhead fluid dispensers;

(c) said cleaning member upon activation being constructed to travel across said printhead fluid dispensers and remove accumulated debris therefrom;

(d) said cleaning member upon deactivation being constructed to transition to said non-obstructing storage position relative to said printhead fluid dispensers so as to permit printing therewith;

(e) said print module having a defined outer confines, and said cleaning member remaining within said outer confines of said print module during transition between said cleaning position and said storage position; and (f) said print module defines a general plane for printing on a printable substrate, and said cleaning member is pivotal between said cleaning position and said storage position about an axis that is generally parallel to said printing plane.

20. A mobile printhead cleaner for a print module, comprising:

(a) a printing apparatus having a plurality of print modules, each of which has an array of printhead fluid dispensers;

(b) a printhead cleaning member movably connected to each said print module and constructed to travel across and clean said printhead fluid dispensers thereof, each said cleaning member being transitional between a cleaning position for said printhead fluid dispensers and a non-obstructing storage position relative to said printhead fluid dispensers;

(c) each said cleaning member upon activation being constructed to travel across said printhead fluid dispensers of its associated said print module and remove accumulated debris therefrom;

(d) each said cleaning member upon deactivation being constructed to transition to said non-obstructing storage position relative to said printhead fluid dispensers of its associated said print module so as to permit printing therewith;

(e) each said print module having a defined outer confines, and said cleaning member associated therewith remaining within said outer confines of said print module during transition between said cleaning position and said storage position; and (f) each said print module defining a general plane for printing on a printable substrate, and said cleaning member for each said print module being pivotal between its said cleaning position and its said storage position about an axis that is generally parallel to said printing plane.

* * * * *